(12) United States Patent
Zubieta Andueza

(10) Patent No.: US 11,214,333 B2
(45) Date of Patent: Jan. 4, 2022

(54) CHAIN-RINGS SET FOR A POWER TRANSMISSION SYSTEM

(71) Applicant: ZUMA INNOVATION, S.L., Galdakao (ES)

(72) Inventor: Mikel Zubieta Andueza, Galdakao (ES)

(73) Assignee: ZUMA INNOVATION, S.L., Galdakao (ES)

( * ) Notice: Subject to any disclaimer, the term of this patent is extended or adjusted under 35 U.S.C. 154(b) by 456 days.

(21) Appl. No.: 16/306,873

(22) PCT Filed: Jun. 2, 2017

(86) PCT No.: PCT/EP2017/063581
§ 371 (c)(1),
(2) Date: Dec. 3, 2018

(87) PCT Pub. No.: WO2017/207811
PCT Pub. Date: Dec. 7, 2017

(65) Prior Publication Data
US 2021/0031879 A1     Feb. 4, 2021

(30) Foreign Application Priority Data

Jun. 3, 2016    (EP) ................................. 16382255

(51) Int. Cl.
*B62M 9/14*        (2006.01)
*B62M 9/10*        (2006.01)
(Continued)

(52) U.S. Cl.
CPC .............. *B62M 9/14* (2013.01); *B62M 9/105* (2013.01); *B62M 9/12* (2013.01); *B62M 9/04* (2013.01); *B62M 9/10* (2013.01)

(58) Field of Classification Search
CPC . B62M 9/00; B62M 9/04; B62M 9/08; B62M 9/10; B62M 9/12; B62M 9/14;
(Continued)

(56) References Cited

U.S. PATENT DOCUMENTS

| 601,990 A | 4/1898 | Suter |
| 2,368,147 A | 1/1945 | Lapeyre |

(Continued)

FOREIGN PATENT DOCUMENTS

| CH | 617992 A5 | 6/1980 |
| EP | 0474139 A1 | 3/1992 |

(Continued)

OTHER PUBLICATIONS

International Preliminary Report on Patentability dated Dec. 4, 2018 re: Application No. PCT/EP2017/063581, pp. 1-7, citing: WO 2016/033623 A1.

(Continued)

*Primary Examiner* — Michael R Mansen
*Assistant Examiner* — Raveen J Dias
(74) *Attorney, Agent, or Firm* — Cantor Colburn LLP

(57) ABSTRACT

Chain-rings set for bicycle including a first chain-ring and a second chain-ring, this latter formed by segments, which includes displacement means with axial component of the segments with respect to the first chain-ring such that they can be moved a the chain free zone ZLC and shift the chain among chain-rings, where the axial displacement means are formed by guiding means configured for guiding the segments such that the relative movement of the teeth of the segments with respect to the small chain-ring in its displacement from a first disengagement configuration to a second engagement configuration has a tangential component opposite to the forward direction.

19 Claims, 24 Drawing Sheets

(51) Int. Cl.
*B62M 9/12* (2006.01)
*B62M 9/04* (2006.01)

(58) Field of Classification Search
CPC ...... B62M 9/105; B62M 9/131; B62M 9/134; B62M 9/1346; B62M 9/1348; F16H 55/12; F16H 55/30; F16H 55/52; F16H 55/54

See application file for complete search history.

(56) References Cited

U.S. PATENT DOCUMENTS

| | | | |
|---|---|---|---|
| 2,827,795 A | 3/1958 | Caballeros | |
| 3,106,101 A * | 10/1963 | Harriman | F16H 55/30 |
| | | | 474/96 |
| 4,055,093 A | 10/1977 | Ross | |
| 4,127,038 A | 11/1978 | Browning | |
| 4,174,642 A | 11/1979 | Martin et al. | |
| 4,417,642 A | 11/1983 | Suzuki et al. | |
| 4,580,997 A | 4/1986 | Browning et al. | |
| 4,592,738 A | 6/1986 | Nagano | |
| 4,810,235 A | 3/1989 | Husted et al. | |
| 5,073,152 A | 12/1991 | Browning | |
| 5,152,720 A | 10/1992 | Browning et al. | |
| 5,205,794 A | 4/1993 | Browning | |
| 5,354,243 A | 10/1994 | Kriek | |
| 5,407,395 A * | 4/1995 | Kramer | B62M 9/08 |
| | | | 474/49 |
| 5,935,033 A | 8/1999 | Tseng et al. | |
| 5,970,816 A | 10/1999 | Savard | |
| 6,267,699 B1 | 7/2001 | Gruich et al. | |
| 6,325,734 B1 | 12/2001 | Young | |
| 6,431,573 B1 | 8/2002 | Lerman et al. | |
| 6,749,531 B2 | 6/2004 | Kang | |
| 7,156,764 B2 | 1/2007 | Mercat et al. | |
| 7,715,566 B2 | 5/2010 | Seo | |
| 7,749,117 B2 | 7/2010 | Carrasco Vergara | |
| 8,092,329 B2 | 1/2012 | Wickliffe et al. | |
| 8,096,908 B2 | 1/2012 | Oishi et al. | |
| 8,753,236 B2 | 6/2014 | Wong et al. | |
| 9,499,233 B2 | 11/2016 | Douglas et al. | |
| 10,259,532 B2 | 4/2019 | Schuster | |
| 10,435,112 B2 | 10/2019 | Tetsuka | |
| 2002/0006842 A1 | 1/2002 | Tetsuka | |
| 2002/0084618 A1 | 7/2002 | Lerman et al. | |
| 2005/0192136 A1* | 9/2005 | Allard | B62M 9/08 |
| | | | 474/47 |
| 2008/0300096 A1 | 12/2008 | Wesling et al. | |
| 2010/0137086 A1 | 6/2010 | Lin | |
| 2011/0045928 A1* | 2/2011 | Wong | F16H 9/24 |
| | | | 474/47 |
| 2013/0267362 A1 | 10/2013 | Gheciu et al. | |
| 2014/0013900 A1 | 1/2014 | Shiraishi | |
| 2014/0155207 A1* | 6/2014 | Wong | F16H 9/06 |
| | | | 474/80 |
| 2014/0248982 A1 | 9/2014 | Schuster | |
| 2014/0303859 A1 | 10/2014 | Miki et al. | |
| 2016/0101825 A1 | 4/2016 | Braedt | |
| 2017/0167590 A1* | 6/2017 | Braedt | F16H 9/24 |
| 2017/0283006 A1 | 10/2017 | Schuster | |
| 2017/0355422 A1 | 12/2017 | Sugimoto | |
| 2020/0263767 A1* | 8/2020 | Allen | B62M 9/10 |
| 2021/0031877 A1* | 2/2021 | Zubietaandueza | B62M 9/105 |
| 2021/0031878 A1* | 2/2021 | Zubietaandueza | B62M 9/12 |

FOREIGN PATENT DOCUMENTS

| | | |
|---|---|---|
| EP | 0945335 A1 | 9/1999 |
| EP | 2602176 A1 | 6/2013 |
| GB | 1529166 A | 10/1978 |
| WO | 9804848 A2 | 2/1998 |
| WO | 2012009571 A1 | 1/2012 |
| WO | 2016033623 A1 | 3/2016 |

OTHER PUBLICATIONS

International Preliminary Report on Patentability dated Dec. 4, 2018 re: Application No. PCT/EP2017/063580, pp. 1-7, citing: WO 2012/009571 A1.

International Preliminary Report on Patentability dated Dec. 4, 2018, re: Application No. PCT/EP2017/063578, pp. 1-8, citing: WO 2012/009571 A1 and U.S. Pat. No. 5,935,033 A.

International Search Report dated Sep. 14, 2017 re: Application No. PCT/EP2017/063580, pp. 1-3, citing: WO 2012/009571 A1 and EP 0 474 139 A1.

International Search Report dated Aug. 24, 2017 re: Application No. PCT/EP2017/063581, pp. 1-4, citing: WO 2016/033623 A1, CH 617 992 A5, US 2014/248982 A1, US 2002/084618 A1, GB 1 529 166 A and US 2009/124440 A1.

International Search Report dated Aug. 3, 2017 re: Application No. PCT/EP2017/063578, pp. 1-4, citing: WO 2012/009571 A1, U.S. Pat. No. 5,935,033 A, CH 617 992 A5, U.S. Pat. No. 6,325,734 B1 and WO 98/04848 A2.

Written Opinion dated Aug. 24, 2017 re: Application No. PCT/EP2017/063581, pp. 1-6, citing: WO 2016/033623 A1.

Written Opinion dated Sep. 14, 2017 re: Application No. PCT/EP2017/063580, pp. 1-6, citing: WO 2012/009571 A1.

Written Opinion dated Aug 3, 2017 re: Application No. PCT/EP2017/063578, pp. 1-7, citing: WO 2012/009571 A1 and U.S. Pat. No. 5,935,033 A.

\* cited by examiner

CHAIN-RINGS SET FOR A POWER TRANSMISSION SYSTEM

TECHNICAL FIELD

The present disclosure mainly belongs to the field of bicycle transmission ensembles, and more specifically to ensembles without any pushing-element in which gear shifts by chain displacement between different chain-rings occur due to the displacement of the segments of one of the chain-rings towards the general plane of an adjacent chain-ring. However, the disclosure can be applied to any other field where smooth and continuous force transmission between different power transmission ratios through a chain is beneficial.

BACKGROUND DISCLOSURE

Power transmission systems with several transmission ratios obtained by combining through a chain several gears of different size at the transmitting axis (chain-rings) and/or the transmitted axis (sprockets) are mainly used in the bicycle sector. For this reason, the evolution of chain transmission systems of several relations has been mainly linked to solve the particular issues of power transmission in bicycles.

On a bicycle, the force executed by the cyclist on the crank arms is transmitted through a chain-ring to the chain, and the latter transmits the force to the rear wheel through a sprocket. Bicycles usually have several chain-rings and sprockets of different sizes, so that, by combining different ones with the chain, multiple transmission ratios can be obtained and depending on these the rear wheel rotates at different speeds for a given rotational speed at the cranks. Pedalling is more comfortable and efficient at a certain cadence (rotational speed of the cranks), and having several chain-rings and sprockets allows, for example, using a small chain-ring and large sprocket combination when moving uphill in order to gear down the speed and to multiply the exerted force, and using a large chain-ring and small sprocket when moving downhill in order to multiply the rotational speed while decreasing the exerted force.

For a higher versatility of the bicycle, it is interesting to have a range of gear ratios as large as possible, as for efficiency and comfort care it is interesting to have small jumps between different gear ratios, so that it is possible to always have a transmission ratio in which the user can be pedalling close to the optimal or the most preferred cadence. Hence the interest of having the largest number of possible transmission ratios in a bicycle.

In the prior art, the chain displacement from one chain-ring (or sprocket) to another in order to engage a different transmission ratio is realized by derailleurs, which are basically pushing elements that can be controlled by one or several controls. To facilitate and improve the displacement of the chain, the chain-rings and rear sprockets have recesses, ramps and pins as described in U.S. Pat. No. 8,092,329-B2 US-2014/0013900-A1 and U.S. Pat. No. 8,096,908-B2. Thus, the chain moves smoothly between the rear sprockets by the rear derailleur, but not so with the front derailleur. In the shift from chain-rings the chain is under tension unlike what happens in the shift from rear sprockets, so it requires more force to move the chain, which generates more friction, increased wear, more abrupt shifting and lower reliability.

Due to this lower efficiency of the front derailleur regarding the rear derailleur, it is more complicated and less reliable to perform a chain-ring shifting than a sprocket shifting. Therefore, currently shifting strategies that minimize the use of the front derailleur are being used. According to these strategies, the whole range of transmission ratios can be covered with a single chain-ring shift. For example, with two chain-rings of 36 and 52 teeth respectively, and 11 sprockets from 11 to 32 teeth, 22 relationships are obtained, out of which only 13 or 14 are usable in the continuous transition from the lowest transmission ratio to the highest transmission ratio, with contiguous transmission ratio "jumps" between 4% and 15.6% as shown in FIG. 1. The critical point in this shifting strategy is the chain-ring shift, which involves a simultaneous shift of 2 or 3 sprockets in order to maintain a reasonable "jump" between transmission ratios, so it is a complex, slow and prone to failure operation. There are different situations in which this chain-ring shift can be made (9 alternatives in the transmission in FIG. 1), so it is up to the user to choose the right time for it. The idea would be to perform this potentially annoying shifting at a time that affects the rider's activity the least.

In order to limit the problems of sequencing chain-ring shifting with sprocket shifting in the case of less experienced riders, U.S. Pat. No. 5,970,816-A describes a system with a single controller which can control both derailleurs (front and rear) sequentially according to the sequence estimated to be optimal. With electronic shifters such as those in US-2014/0303859-A1 it is also possible to configure the electronic control unit to follow a certain sequence between transmission ratios as a response to simple commands provided with the shifter controller.

U.S. Pat. No. 4,055,093-A also describes a control switch that governs both derailleurs simultaneously, but in this case following a strategy known as "half-step", in which a chain-ring shift occurs at any shift in the transmission relation. For such purpose the proportional size difference between the chain-rings in this disclosure is about half the size difference between successive sprockets, so that with a chain-ring shift a transmission relation that is in between two successive sprockets is obtained, and the number of effective gear ratios is twice the number of sprockets. This shifting strategy presents a better staggering of gear ratios and a simpler and clearer shifting logic, however it requires using the chain-ring shifter at each gear change, which is a great limitation due to the chain-ring shifters available nowadays.

In order to solve this problem a large number of alternative solutions to perform the chain-ring (or sprocket) shifting have been proposed, for example, EP-0945335-A1, U.S. Pat. Nos. 7,712,566, 5,354,243, 5,152,720, 4,810,235, 7,156,764 B2, CH-617 992-A5 or US-2014/0248982-A1. Among all, those with the highest relation to the present disclosure proposal are highlighted next.

U.S. Pat. No. 5,354,243-A describes a system that does not include a traditional rear derailleur. The sprocket shifting is performed by guiding the chain with the sprockets themselves. It consists of a flexible package of equidistant sprockets with a radial cut. In its default position the sprockets are multiple disk planes defined in space. However, it is possible to deform laterally the sprockets in either direction so that the end of each sprocket is aligned with the end of the next sprocket, forming a spiral on which the chain can move to change the plane, in either sense. The main limitation of this disclosure is that, due to the flexibility of the sprockets, rigidity and strength problems arise in the power transmission. The disclosure U.S. Pat. No. 5,152,720 A solves this problem by rigid sprockets with an articulated 90-degree section that operates in the same way as the prior disclosure and is valid for changing sprockets as well as for shifting chain-rings. This system presents structural limitations at the time of transmitting the power through the articulated section whose rigidity is less than the rest of the chain-ring. Another limitation is that with only one articulated section, the shift can only be carried out in one point of the pedalling cycle, so that changes are slow.

CH-617992-A5 discloses a solution similar to U.S. Pat. No. 5,354,243-A with flexible sprockets/chain-rings, but in this case they behave differently. Instead of forming a spiral to move the chain, the new sprocket/chain-ring is formed in the same plane of the previous one so that the chain does not change plane. That is, the plane of the chain transmission is always the same. In CH-617 992-A5 several configurations are also presented in which the chain-rings are divided into several rigid segments that enter the smaller chain-ring's plane while passing through the chain-free zone create a large chain-ring, or that alternatively exit the plane to leave the chain engaged on the smaller chain-ring. A linear displacement parallel to the axial direction of chain-rings, or an angular displacement resulting in the same direction at the end of its route is considered.

The segments, flexibles or rigid, have axially arranged pins (parallel to the axis of the chain-rings) with hooks on the ends (FIGS. 7 and 15 in CH-617992-A5), so that a cam can move the segment, progressively in the flexible segments or at once in the rigid segments, between its two positions. These pins also have an engaging mechanism by which they engage with the teeth of the lower chain-ring with the aim of giving higher rigidity to the segment when transmitting the force through this segment. However, it should be noted as a limitation of this solution that the result is not the most appropriate. On one hand, the teeth profile is usually designed for easy engagement and disengagement of the chain such that its geometry makes difficult the attachment between segments, and makes it much more difficult when the teeth are worn by use and their geometry varies. Furthermore, the power transmission is performed by the guiding elements themselves of the shifting movement, which are the pins. If the guide pins have to meet structural functions in power transmission, they will require proper sizing and tight fit to avoid gaps, which hinder the sliding of these pins at the time of shifting.

The engagement of the pin in the tooth of the lower chain-ring, or friction in the sliding pin point should be firm enough so that the segment maintains its position against the forces it may axially receive. For example, although the force of the chain is primarily tangential to the segment, depending on the rear sprocket engaged, the chain acquires a certain angle, so that the force can have a significant axial component. Thus, the resistance to axial displacement of the segment must be high, which demands that the actuation force for shifting has to be high as well.

In the solution disclosed in CH-617 992-A5, the driving of the pins is performed by a cam attached to the bicycle frame so that the force for shifting comes from the rotation of the chain-rings themselves, that is, part of the transmitted power is lost in shifting. Although the cam is a passive element in this shifting, it needs to exert a high reaction force so it has to be firmly attached to the frame. Currently, the bicycle frames do not have any attachment space for this purpose, and the system must be adapted specifically to each bicycle frame design, which is a major limitation.

Another major limitation of the actuating cam is that even after making the shift, it keeps contact with the hooks of the pins, and even not activating them, there is some continuous friction due to this contact, which slows down the system wasting energy, increases wear and can even cause noise.

US-2014/0248982-A1 presents a solution whose main objective is to solve this last limitation of the CH-617 992-A5 device. To this end, the driver part of the segments lying in the rotating part (chain-rings set and cam) includes an elastic element so that this mechanism has only two stable positions in its path (FIG. 24-25 in US-2014/0248982-A1) corresponding to the two operating positions of the segment (in the operating plane and out thereof). Thus, to execute a shift, the driver part of the segments which is in the stationary part (whole frame) only has to operate the mechanism of the rotating part until it moves beyond the intermediate point between these two equilibrium positions. From there, the movement of the segment is produced by the effect of the elastic element of the mechanism of the rotating part, without contact of the stationary part with the rotating part. Thus, after the shift there is no contact, no friction, no wear, no noise between rotating and stationary parts of the driver.

For the mechanism of the rotating part to work properly, the spring force must be higher than the frictional forces of that mechanism so that there is movement. This spring force creates a preload against the stops in the two extreme positions which confers some stability to the segments in their two positions in front of external forces such as vibrations or forces the chain. The higher the rigidity of the elastic element the higher the force to stabilize the segments will be.

In FIGS. 14 to 16 of US-2014/0248982-A1 a configuration in which the displacement of the segments has a radial component along the axial direction in order that the very presence of the chain provides stability to the segments is also disclosed. However, the displacement path indicated is not optimal for that purpose. In an arc of a segment in which the displacement is radial with respect to its center point, applying a tangential force at the central point does not lead to a force in the displacement direction, but applying this tangential force at one end implies a radial component towards one side on one end and to the other side on the other end. Thus, it is not possible to get a stabilization force for all transmission conditions of the segment using this displacement path. For example, in the arrangements mentioned in US-2014/0248982-A1, the initial contact of the chain in tension with one of the segments causes a centrifugal reaction force that tends to draw the segment out of its position. However, in this displacement the chain is pulled until the previous link contacts the tooth of the preceding segment rapidly slowing this movement. The force of the chain in the last contact tooth causes a centripetal reaction force that stabilizes this segment, and then the whole segment. In such a way, it is noted that with a movement path of the segments that has only axial and radial components, in the first half of the engagement the chain tension tends to destabilize the support of the segment and can cause slight displacements involving friction, wear and noise. Furthermore, in this condition the power transmission will not be clear; part will be made by the new segment being engaging and another part by the previous segment to which the tension is transmitted due to the tolerance.

In fact, the power transmission is the most limiting aspect of the solutions presented in US-2014/0248982-A1. In all configurations indicated the power transmission from the cranks to the chain-rings is performed through the guiding and driving elements. This requires oversizing these elements with respect to their primary mission of carrying out the shifting movement, and also requires adjustments and tighter tolerances to avoid gaps in the operation, which complicate and make expensive the product and also hinder a smooth movement in the shift which should be the main mission of the guiding. This is a major limitation of the system because the forces for stabilizing the segments of the elastic members and the geometric stabilization of the segments due to the chain are not effective, if the rigidity and the ability to transfer power are limited by the guiding elements.

Under these conditions, in which the guiding elements can have a high friction and the elastic members on the rotating part may have a high preload, the force required for a chain-ring shift will also be high. In most of the configurations exposed in 2014/0248982-A1 this energy will come from the force applied by the cyclist on the pedals, but in all cases a firm attachment of the static part to the frame to minimally exert the reaction to the shift forces will be required. And as described above, the current bike frames do not have an attachment point indicated for this function, so it is necessary to adapt the union of the stationary part of the shift system to each particular frame, which is a major limitation.

Another solution presented in US-2014/0248982-A1 is the driver of the segments by force and not by displacement. FIGS. 4 to 7 show a system in which the displacement of an actuator preloads elastic elements that move the segments, but only when they can be displaced. This is used to activate all segments at once, and thus preloading all segments, but only the segment located at this moment in the chain free zone will immediately move, while the remaining will be subjected in position by the chain and will not move until they enter the chain free zone where they will be released of the chain.

A further limitation of CH-617992-A5 and US-2014/0248982-A1 devices, due to their mechanical activation, is that there is no control of the first segment to be shifted; the first one to be displaced will be the first to enter the area of displacement, i.e. the chain free zone. This is not a problem for the solutions presented in these documents because all segments are equal, so it does not matter which one moves first. But it would be a great limitation on systems with different segments having different functions where a particular sequence is required in the shifting process.

WO2016033623A1 document is based on document US-2014/0248982-A1 to which it adds electronic activation of the segments, and wireless control of these actuators. Thus, it is able to integrate the entire mechanism in the rotating part, and do not need any element on the fixed part of the bicycle frame. This ensures that the system is compatible with any bike and also removes all friction between the stationary and rotational parts. However, limitations remain in power transmission involving the guiding and driving elements, and therefore requires their oversizing. Moreover, the actuators require high forces to move the segments due to friction, and then keep them stable in the end positions, so it requires bulky, heavy and high consumption actuators.

US20020084618 also describes a system for shifting from the movable segments in which the driver is mechanical segments in the rotating part, and in its contact with the stationary part, but then the driver is electric in the stationary part. Thus it enables control in the movement of the segments as in WO2016033623A1. In fact, the document describes various sensors and control strategies for the automatic transmission. For the rest it is very similar to what is described in US-2014/0248982-A1, because it has a drive system based on elastic systems such that the contact between the stationary and rotational parts occurs only at the time of shifting, but also the transmission of forces has to be done through guiding elements and actuators, and these also responsible for giving stability to the segments, which have to be oversized.

Finally, within the structural limitations of the solutions described in CH-617 992-A5, US-2014/0248982-A1, WO2016033623A1 and US20020084618 it is pointed out that in all of them only the option that the segments are on the same operating plane is disclosed. This severely limits the space available in the segment to support the teeth of the segment and create a structure with appropriate stiffness and resistance. If both chain-rings have to be simultaneously in the same plane, the largest chain-ring has to be at least four more teeth than the smaller chain-ring as illustrated in FIG. 6 CH-617 992-A5. However, this embodiment is not recommended because on the one hand the part supporting the teeth seems very weak as illustrated in FIG. 7 of CH-617 992-A5, and on the other hand the height of the teeth is also somewhat low, which can involve problems in retaining the chain when faced to vibrations or other external forces. To allow implementing a solution with both chain-rings in the same plane it would be advisable that the difference between successive chain-rings is at least of five or six teeth.

BRIEF SUMMARY

To provide a solution to the shortcomings of the prior art, the present disclosure proposes a set for a power transmission system, the set comprising a first chain-ring, a second chain-ring having a common axis with the first chain-ring and provided with more teeth than the first chain-ring, and a chain, wherein the second chain-ring is formed by segments, the chain-rings set comprising displacement means with axial component (according to the common axis) of the segments with respect to the first chain-ring such that the segments can be sequentially moved in chain free zone and such that are defined for each segment at least two configurations:
  a first configuration wherein the segments are in a first position away from the first chain-ring in the direction of the common axis and wherein the chain can engage with the first chain-ring without interference of the segments;
  a second configuration wherein the segments are closer to the first chain-ring in the direction of the common axis than in the first configuration and wherein the chain can engage with the second chain-ring;
  wherein the axial displacement means are formed by guiding means and drivers, wherein the guiding means are configured for guiding the segments such that the relative movement of each tooth of the segments with respect to the first chain-ring, in its displacement from the first configuration to the second configuration, has a tangential component having the sense of the chain traction.

Segment should be understood as that the second chain-ring comprises segments spanning angular sectors such that the sum of all of them is 360°. The segments are separated from each other by lines starting from the periphery toward the center. These cut lines should not necessarily be radial but for structural reasons they can take various forms. What is essential that there are cuts that separate the successive segments.

As is known, during power transmission the chain causes a traction on the teeth, and therefore on the chain-rings, in the opposite sense of advancement of the teeth of the chain-rings with respect to the structure supporting the transmission set, which preferably is part of a bicycle. The chain-rings are meant to be mounted such that in pedalling and traction conditions they have a certain rotation direction. Therefore, in other words, the relative movement claimed permitted by the aforementioned guiding means has the sense opposite to said relative movement to the support structure of the set, or what is equivalent, the relative movement claimed permitted by the aforementioned guiding means has the sense of net traction of the chain on the engaged part of the chain-rings.

The context of the disclosure is the segmented chain-rings designed so that the segments can move axially and sequentially in the chain free zone to cause a shift between the first and second configurations, all without derailleur. In the first configuration, the segments do not act and are far enough from the first chain-ring so as to not interfere with the chain engaged with the first chain-ring, which is the small chain-ring.

For changing from the first configuration to the second configuration, a segment that is in the chain free zone is moved to a position close to the first chain-ring at a time when the chain has not yet engaged that region of the first chain-ring and so that in the rotation, when the chain will engage in that region, it does it in the teeth of the segment displaced and not in the teeth of the first chain-ring.

Subsequently, the posterior segments are also moved to a position close to the first chain-ring, generally getting solidary therewith, to be the segments which will engage with the chain, and reach the second configuration in which the chain is engaged on the second chain-ring, which is the big chain-ring.

On the other, for the shift from the second configuration to the first configuration, a segment found in the chain free zone is moved to a position away from the first chain-ring, such that in the rotation, when the chain is going to engage in this zone it cannot do it on this segment and engages with the first chain-ring. Subsequently, the subsequent segments also move away from the first chain-ring so that the chain completely engage with the first chain-ring and reaches the first configuration.

According to the disclosure, the segments that make up the second chain-ring have links with the first chain-ring designed such that the approaching of these segments is not purely axial, but have a tangential movement, with reference to the first chain-ring. This tangential movement allowed by the guiding means cannot have any sense, but must be opposite to the direction of the teeth, according to an absolute reference, when the rapprochement between segment and chain-ring occurs, i.e. have the sense of the traction on the chain.

In a transmission system comprising chain-rings, a chain and a set of rear sprockets with an arm for shifting from the rear sprockets (for example in a bicycle), the power transmission between chain-rings and rear sprockets produce a tension in the chain which results in a tangential force applied on the teeth of the chain-rings. In a hypothesis of rigid solids, this tension would be made in the teeth that are in contact with sections of tensed chain between chain-rings and rear sprockets, both in the top part of the chain, which is where traction is produced for the transmitted power, as in a lower part of the chain, where traction is produced by the shift arm from the rear sprockets.

According to the disclosure, the teeth of the segments have a movement relative to the small chain-ring having tangential direction and opposite to the direction of advancement of the teeth, i.e. in favour of the sense in which the high tensile force is performed on by the chain. As a result, if the chain engages with any tooth of a segment, the pulling force has a component in the direction of the guiding means, and therefore the segments tend to move to the second configuration.

This force can be high enough to bring the segments to a firm and stable position against the first chain-ring without other external forces. In other words, that the forces causing the locking of the segments with respect to the small chain-ring do not come from a driver dedicated to this purpose, but comes from the force of the chain, which is high.

Therefore, the drivers only have to carry out the displacement of the segments when these are in the chain free zone and consequently the force required of the drivers has to be only of sufficient magnitude to move the segments when no other forces are applied thereon, apart from the reaction forces of the support structure, which may be the first chain-ring. Once the engagement of the segment with the chain is achieved, this engagement will be responsible for ending the shift, if necessary, and take the segment to a firm and stable position against the first chain-ring, position sufficiently strong and stable to transmit high forces between the cranks and the chain.

Similarly, after executing the shift to the second configuration, if any of the segments moves from the second configuration due to some vibration or external shock, but remains within the reach of the chain, it will be the chain itself which returns the segment to its due position, stabilizing the system again.

In other words, by taking advantage of the high forces of the chain tension, a coupling of the segments that lead them to strongly attach with the first chain-ring can be achieved, so that the second chain-ring can be considered as if made of the first chain-ring and the segments. That is, the first chain-ring, thanks to the high coupling tension with the segments, becomes the main support structure of the second chain-ring. Therefore, the segments can be implemented with small, easily movable parts.

In the prior art solutions, in which the force of the chain does not guarantee the stability of the segment during the transmission, due to the configuration of the guiding elements without tangential component in its movement, this stabilizing force must be provided by an actuator, for example. In fact, the strength of the chain itself, when engaged in the segment and a small rear sprocket, has an axial component that tends to pull the segment out of its position in the second configuration. Since the chain forces can be very high, the actuator must also exert large forces to maintain the segment stable in position in the second configuration. Thus, an additional advantage of the proposed disclosure is that less driving force is required, such that the drivers can be more compact, lightweight and inexpensive, and with a much lower consumption, thus also simplifying the batteries and the supply circuit.

In some embodiments, each one of the segments and the first chain-ring, or a part solidary to the first chain-ring (rotating part fixed with respect to the small chain-ring), comprise constraint means that in the second configuration integrally transmit the traction force of the chain to the first chain-ring, or to the part solidary to the first chain-ring, while no exerting opposition forces to the drivers forces when the segments are stressed to bring them from the second configuration to the first configuration.

These constraint means have two essential functions. First to determine the correct working position of the segments for traction by the second chain-ring. Second, they must ensure effective and stable transmission forces of the chain to the first chain-ring, which, as indicated, in the second configuration forms the central support structure of the second chain-ring.

On the other hand, these constraint means must not prevent or hinder the movement of the segments from the second configuration to the first configuration. Thus, this configuration of the abutment means minimizes the structural requirements on the guiding means and drivers. Due to the configuration of the constraint means which resist the forces corresponding to the chain, these forces do not affect the guiding means and driver, such that more compact and lighter guiding means can be used to only perform their essential guiding and driving function.

Moreover, as the constraint means do not limit the movement of the segment between configurations, the actuator force necessary to move said segment in the free chain zone is minimal, and only responds to the dynamic requirements (force required to move a mass in a given time interval) and those due to possible disturbing external forces (vibrations, segments inertia, . . . ) which will be small in magnitude. Thus, low-power compact drivers can be used that in turn require compact and lightweight power and accumulation systems. As for the guiding means, with this configuration of the constraint means, its function is to guide the segment path during movement between the first and second configurations, resisting possible external perturbations (vibrations, inertia, . . . ).

It is noted that this configuration of the constraint means provides significant advantages over the known prior art, where the guiding means and actuators are usually an active part in the transmission of the advancing forces, which involves oversizing these guiding means and actuators, and even in these conditions the correct transmission of the forces is not ensured.

It is emphasized that the mechanical links between the chain-rings can be direct, as in the preferred embodiments set forth below, or may be intermediate structural elements. For this reason, alternatives relating to 'other integral parts of the first chain-ring' are mentioned.

In some embodiments, the constraint means comprise at least two frustoconical protuberances in each one of the segments or in the first chain-ring and two complementary openings in the first chain-ring or in each one of the segments respectively.

In the present disclosure it is intended that the constraint means satisfy at least two conditions, apart, obviously, that are inexpensive to manufacture. First it must be ensured that the power transmission of the chain in the second configuration is optimal. Secondly, the coupling must only be in the second configuration and this coupling must cease to be effective from the time the displacement of the second configuration to the first starts. That is, contact surfaces are sought capable of transmitting high forces in various directions but that are released in another direction when stressed by reduced forces. To do this, surfaces having a good finish for low friction and a geometry with angles for disengagement are necessary. In general, it is easier to obtain good manufacturing quality in revolution parts so cones have an appropriate geometry for this function.

In some embodiments, the first chain-ring is formed by a support part of the teeth and a teeth part, the second chain-ring is formed by segments, each formed by a support part of the teeth and a teeth part, and the guiding means are configured to bring the support parts of the second chain-ring in contact with the support part of the first chain-ring, the segments being circular crown sectors or oval crown sectors.

The implementation of segments as circular crown angular sectors is the simplest. The only thing that must be ensured is that the support part has enough space for the arrangement of the constraint means necessary between segment and small chain-ring.

In some embodiments, each segment has a driver.

In some embodiments, the set comprises an angular position sensor.

For the correct shift between the first configuration and the second configuration it is necessary to move the segments by a driver at the appropriate time, preferably when they are in the free chain zone. Therefore, it may be necessary to have an angular position sensor indicating the position of each segment, so that the control system can determine the appropriate time to move each segment.

In some embodiments, the driver or the drivers comprise an actuator and an elastic element arranged in series.

As described, the displacement of the segments must occur at certain times, preferably in the free chain zone to shift from configuration appropriately. The displacement of the segments at other times can cause problems, such as interfere with the chain in its displacement, which would create tensions in the actuator which is trying to move the segment while the chain prevents it. These tensions may damage the actuator, and provoke an improper operation during shifting.

To limit these tensions and protect the actuator it is possible to interpose an elastic element between the actuator and the segment, so that in case of actuation of the actuator when the segment is in locked position (by the chain), the elastic member is capable of accumulate the energy transmitted by the actuator, and release it once the segment is unlocked, displacing at this time the segment. Thus, it is observed that the elastic element as well as being a safety element to limit tensions, can also be a control element able to move the segments at the appropriate time.

This feature allows to implement simplified embodiments based on a common driver order for all segments. Specifically, a driver comprising an actuator and an elastic element allows the preloading of the elastic element when the segment is in the second configuration and then release it towards the first configuration when passing to the free chain zone. This allows to implement embodiments devoid of an individual control per segment.

As will be seen below, it is an option in which the actuation does not necessarily mean displacement, but this displacement will occur when the segments enter the free chain zone. The elastic elements are meant to allow this behaviour.

In other words, in the proposed disclosure with the chain that stabilizes the position of the segments in the second position and in which the elastic elements of the drivers retain the displacement of the segments until they are in the appropriate area, it is possible to trigger all the actuators simultaneously and allow the system to regulate itself to execute the chain-ring shift appropriately. This is a solution that simplifies the control system, and reduces the chances of failure as well.

In some embodiments, some of the segments comprise a stop (for example a tab) of the contiguous segment, such that a segment subsequent or previous cannot move from the first configuration to the second configuration or vice versa if the segment provided with stop does not move.

This is a feature that allows a mechanical and automatic control over the segments between configurations, especially designed for when the control of the segments is not individual but is based on a single simultaneous operation.

As described, it is possible to trigger all the actuators simultaneously, and let the system according to self-manage through the elastic elements to obtain a shift sequence. Previously the manner in which this sequence corresponds to the relative position of the chain relative to the segments has been described. An alternative way to control this sequence is with detents between the segments, so that a certain order of displacement between these segments is imposed. This can be used, for example to gain driving time in shifting.

In some embodiments, the drivers are pneumatic.

Pneumatic actuators are fast drives suitable for conditions where high precision and high strength are not required making them suitable for this application. Moreover, since they are elements based on air, they bring the further advantage in this application if the compressibility itself of the air is used as elastic element of the driver, thereby simplifying the system. To take advantage of these elastic properties of air is preferable to work with low pressures.

In some embodiments, the drivers are pneumatic cylinders, which also form the guiding means.

The pneumatic cylinder can perform the functions of actuator and elastic member due to the compressibility of the chambers inside as discussed above. In addition, the pneumatic cylinders have a shaft that can fulfil the guiding functions of the segment, which also simplifies the system.

In some embodiments, the drivers are bladders.

This is an alternative to the pneumatic cylinders. By bladder it is meant a closed shape with a cavity for the pressured air that changes its shape when the pressure therein increases, displacing one end which is attached to the segment in the displacement direction. This structure can be more compact than a pneumatic cylinder and also has less friction. In this case, the elasticity of drive depends on the compressibility of air and the elasticity of the bladder. The disadvantage respect to the cylinder is that the guiding of the movement performed is not effective, so it is desirable to have guiding elements in addition to the driver.

In some embodiments, the elastic elements are arranged for bringing the segments towards the first or towards the second configuration when no forces are exerted by the actuators.

Actuators, in their action, move and cause a preload on the elastic element. If the actuator is moved to its first configuration, the elastic member acquires a preload to move the segment to the first configuration, if moving to the second configuration, the preload of the elastic element is to move the segment to the second configuration. So that even when the actuator stops acting, the elastic member will maintain the preload to move the segment to the first or second configuration until this displacement becomes possible.

In some embodiments, the set comprises pumping means or pressurize fluid storage means to actuate the drivers.

For application to the transmission of a bicycle, the pneumatic elements, like the electrical elements (angle sensor, controls, . . . ) are all integrated in the rotational part, and there will be not need to add anything to the fixed part of the bicycle, so it is compatible with all currently available bike frames, and is also very easy to assemble. Nor there is no friction between the rotational and the fixed part because there is no fixed part.

The driving system will be commanded wirelessly from the controls of the bike. The same commands can also control the rear derailleur, so that, for example, in a half-step shift strategy the transmission relation can be sequentially selected from the controls and then the CPU will be responsible for deciding which chain-ring shifts and/or rear sprockets shifts have to be carried out. Thus the ease of use is improved over existing systems in the market.

In the half step strategy the jump between different sprockets is about twice the jump between the two chain-rings. Thus, the shifts are sequenced with a chain-ring shift between each rear sprocket shift. Because of this, in multiple shifts (very followed orders, orders through other specific buttons, or for example a continuous press) shifting chain-rings does not make any sense; it is preferable to shift by directly shifting the rear sprockets. Thus dispensable chain-ring shifts are avoided, thus reducing the consumption and wear of the actuator in the system for its use, while faster shifts are obtained over the available systems in the market. It would be like comparing current shifts from rear sprocket to rear sprocket with shifts two by two, which are half faster.

This behavior also shows one of the great advantages of the proposed system that the transmission system continues to operate with most of its properties (similar range, only with jumps twice as large) even if no chain-rings shifts are carried out. The system for chain-rings shifting proposed is an additional system, but non limiting, to optimize the transmission performance. And in case of any problems in this system for chain-rings shifting, its lock on a particular chain-ring does not entail a dramatic worsening of the behaviour of the transmission. So the bike can still be used until it can be repaired.

The transmission relation shift can also be done automatically based on different sensors. In the proposed system, changes of chain-rings have a very high smoothness, far superior to what currently exists in the market, which together with current sprockets shifts that are smooth enough, it is possible to make any shift smoothly, at any time and without adversely affecting the progress of the cyclist. It is also vital for the half-step strategy, with a clear shift sequence and minimum jump between the transmission relations, to be electronically controlled with a CPU. This way, there is only a need to add a control logic based on sensors arranged on the bike (power, speed, cadence, gradient, . . . ), the cyclist (beats, . . . ) or environmental sensors (temperature, terrain conditions and environment, . . . ) to obtain the desired displacement conditions: maximize performance, schedule a training, maximize comfort, . . . .

Finally, the disclosure also relates to a bicycle comprising a chain-rings set according to any of the sets disclosed according to the disclosure.

This system for chain shifting-rings is especially designed for bicycle transmissions. However, it can be applied to transmission-based chains of any other machine on any axis (transmitter or receiver axes). Even in the bicycle, although the advantages of the shifting system are more noticeable in the transmitter shaft (chain-rings shift), the shifting system could be applied in the receiver axis (rear sprockets shift). In the present description the application of the disclosure to a two chain-rings set has been described. However, many of the concepts presented here can be generalized to sets of three or more chain-rings. In that case, for example, all the chain-rings except the smallest would be segmented, where a big segmented chain-ring would act as a first non-segmented chain-ring for a segmented chain-ring even bigger. Then, for example, in a bicycle four chain-rings (44, 49, 54 and 60 teeth) and four rear sprockets (12, 18, 27 and 41 teeth) could be combined using this technology, resulting in 16 relations covering a wider range than a conventional transmission, but with better staggered jumps between 10% and 11.4%.

The concepts disclosed can be also applied to other equivalent configurations and different sizes and can be applied to other fields where a power transmission smooth and precise with multiple relations is required.

The proposed disclosure corresponds to a system for shifting chain-rings wherein one of the chain-rings is segmented and moves respect to the other and which solves the technical problems involved in the systems disclosed in the documents CH-617992-A5, US-2014/0248982-A1, WO2016033623A1 and US20020084618.

The innovative way of displacing the segments between first and second configurations described here together with the configuration described of the constraint means confers notable advantages over the known to the proposed solution:

In the second configuration, any force of the chain applied on the segments implies stabilize its position in this second configuration and reinforce the force transmission structure.

All forces of the chain are transmitted through the constraint means, which are rigid structures designed to fulfill this function, whereby the guiding elements and drivers only have to handle the guiding and driving between configurations, unlike what happens in the prior art, and therefore can be much more effective in their function.

As in other solutions of the known art, incorporating an elastic element the sequential displacement from the first configuration to the second configuration can be self-managed. But on the other hand, and for the first time, due to the ability of the chain forces to retain the segment in the second configuration, the sequential displacement from the second configuration to the first can be made automatic too.

This is the first time the driving of the segments based on pneumatic drivers is proposed that has the advantage of simultaneously fulfilling the functions of driving and elastic element in very compact and light sets.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION

As shown in the figures, the disclosure relates to a set for a power transmission system, especially designed for a bicycle.

This set comprises a first chain-ring 1 and a second chain-ring 2 having a common axis E with the first chain-ring 1 and provided with more teeth than the first chain-ring 1.

As shown in FIGS. 11, 12, 16, 18 and 19 for example, the second chain-ring 2 is formed by segments 21, 22, 23, 24, 25, 26, that can be moved with displacement means with axial component of the segments 21, 22, 23, 24, 25, 26 with respect to the first chain-ring 1.

Figure 12:
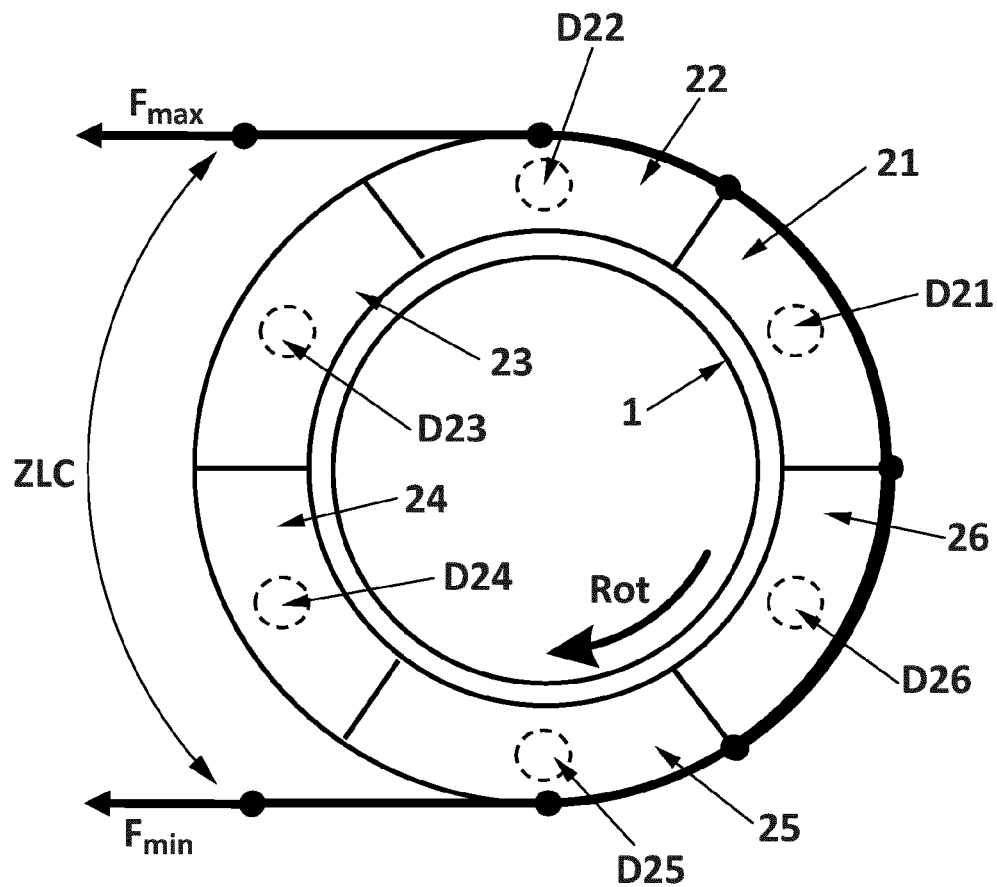
FIG. 12 is a lateral schematic representation of the small chain-ring and of the segments of the big chain-ring.

In this way, as shown in the FIG. 12, the segments can be sequentially moved in the chain free zone ZLC.

Figure 14A:
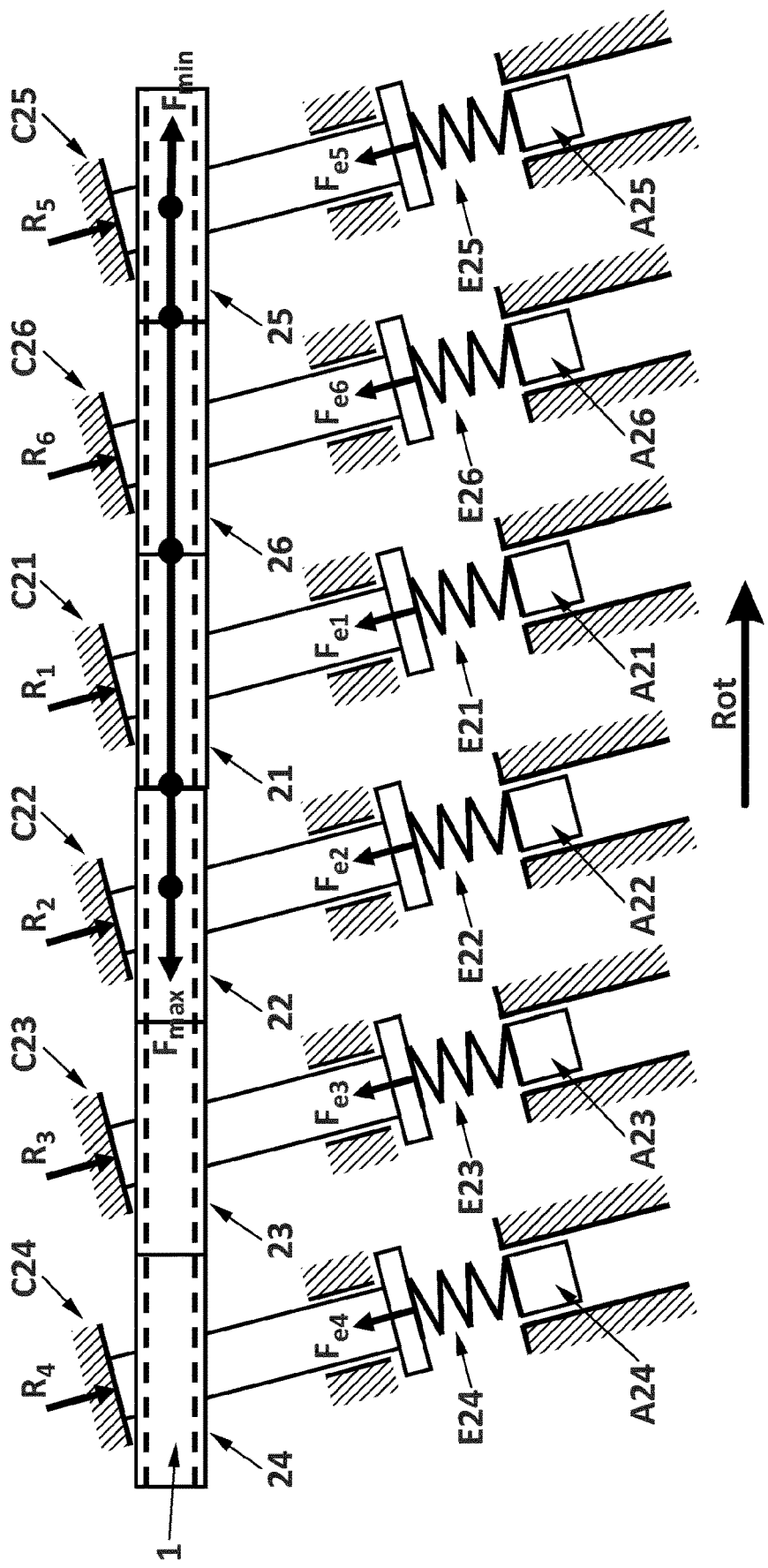
FIG. 14A is analogous to FIG. 13, but here a particular structure of the drivers is shown.
Figure 14B:
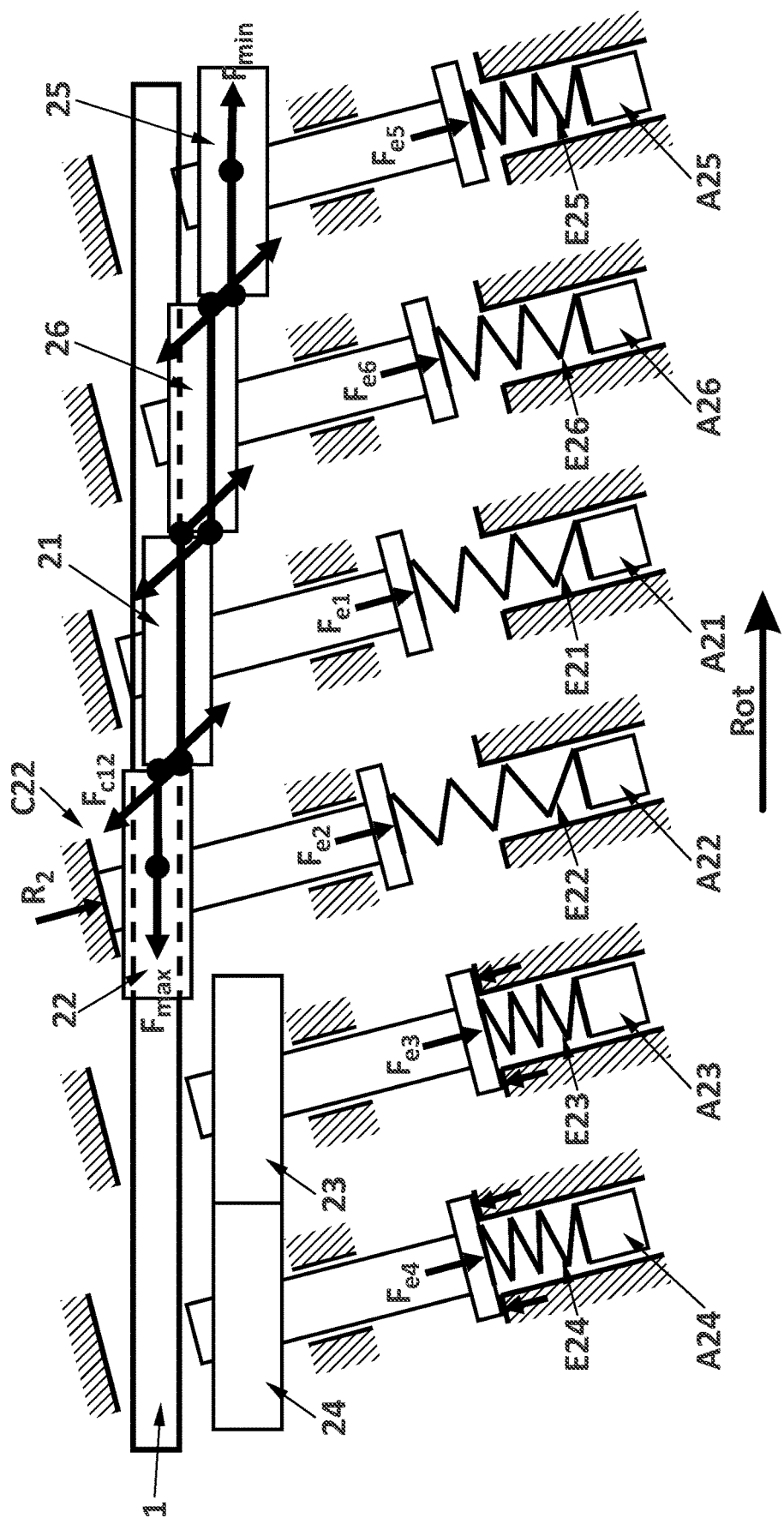
FIG. 14B shows a configuration wherein the chain is still engaged with the big chain-ring, but wherein some segments are moving for causing the shift from chain-ring.
Figure 14C:
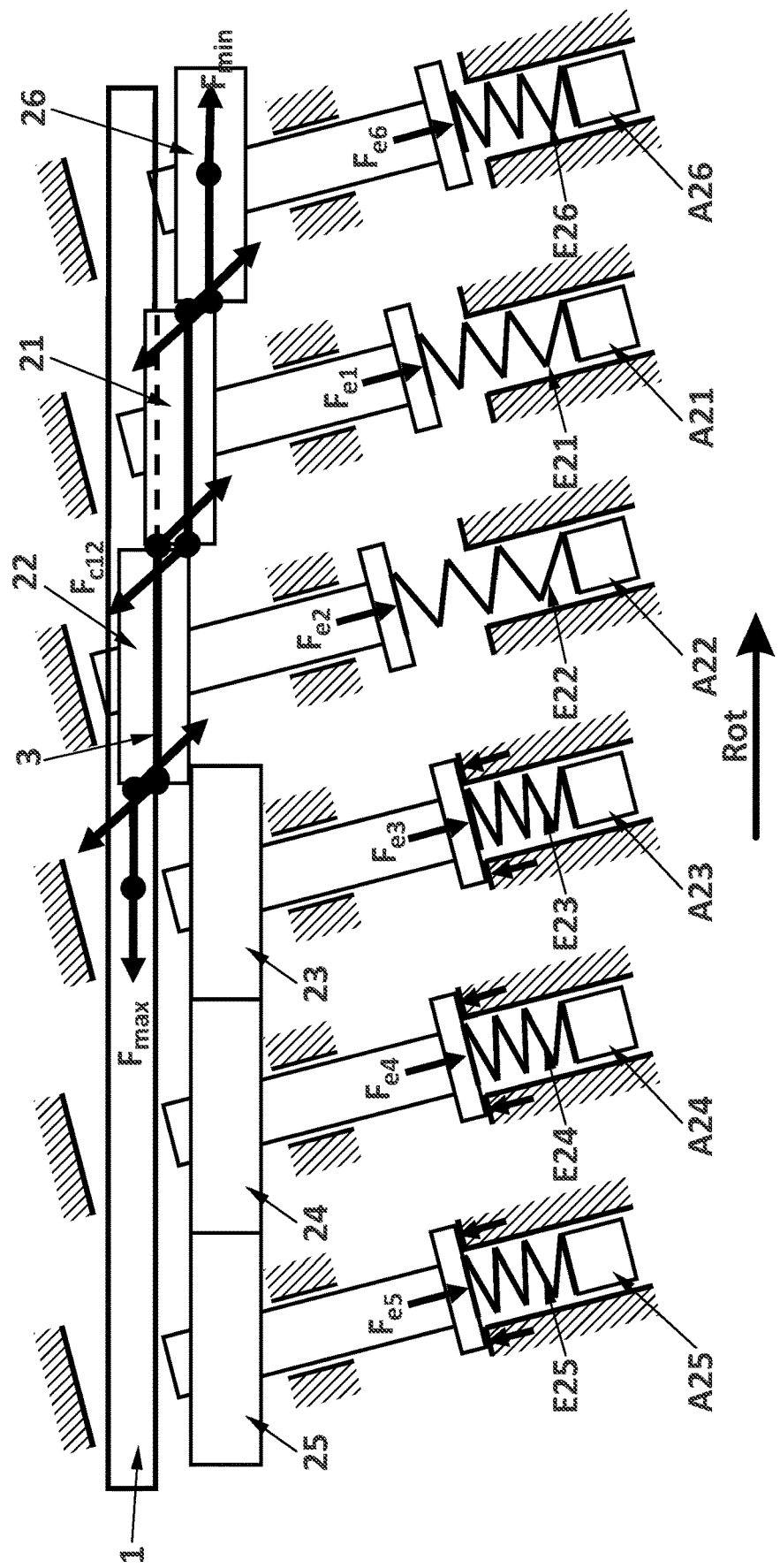
FIG. 14C shows a configuration wherein the chain starts the engagement with the small chain-ring while being still partially engaged with the big chain-ring.
Figure 14D:
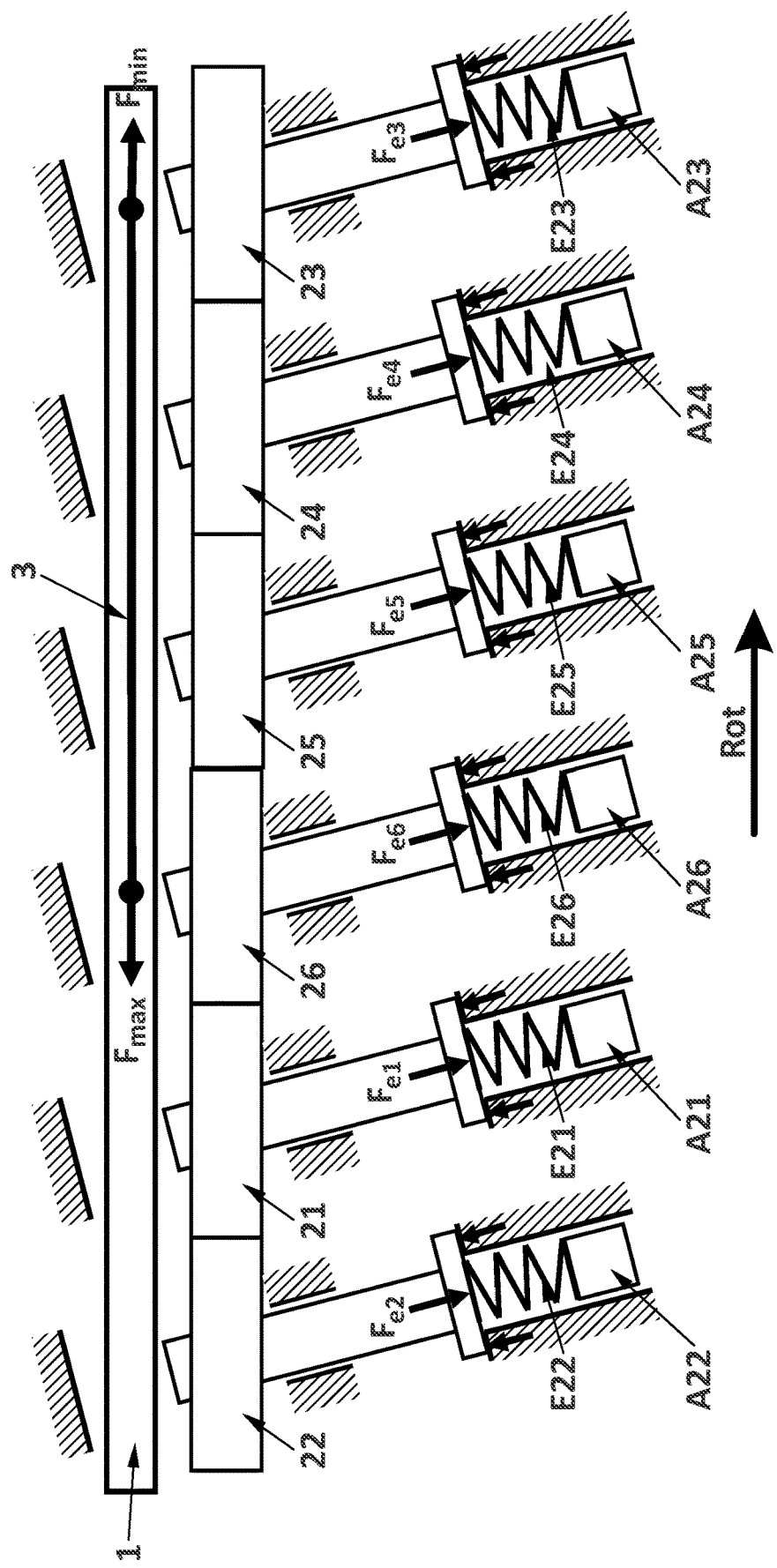
FIG. 14D shows the resulting engagement in the small chain-ring.
Figure 15A:
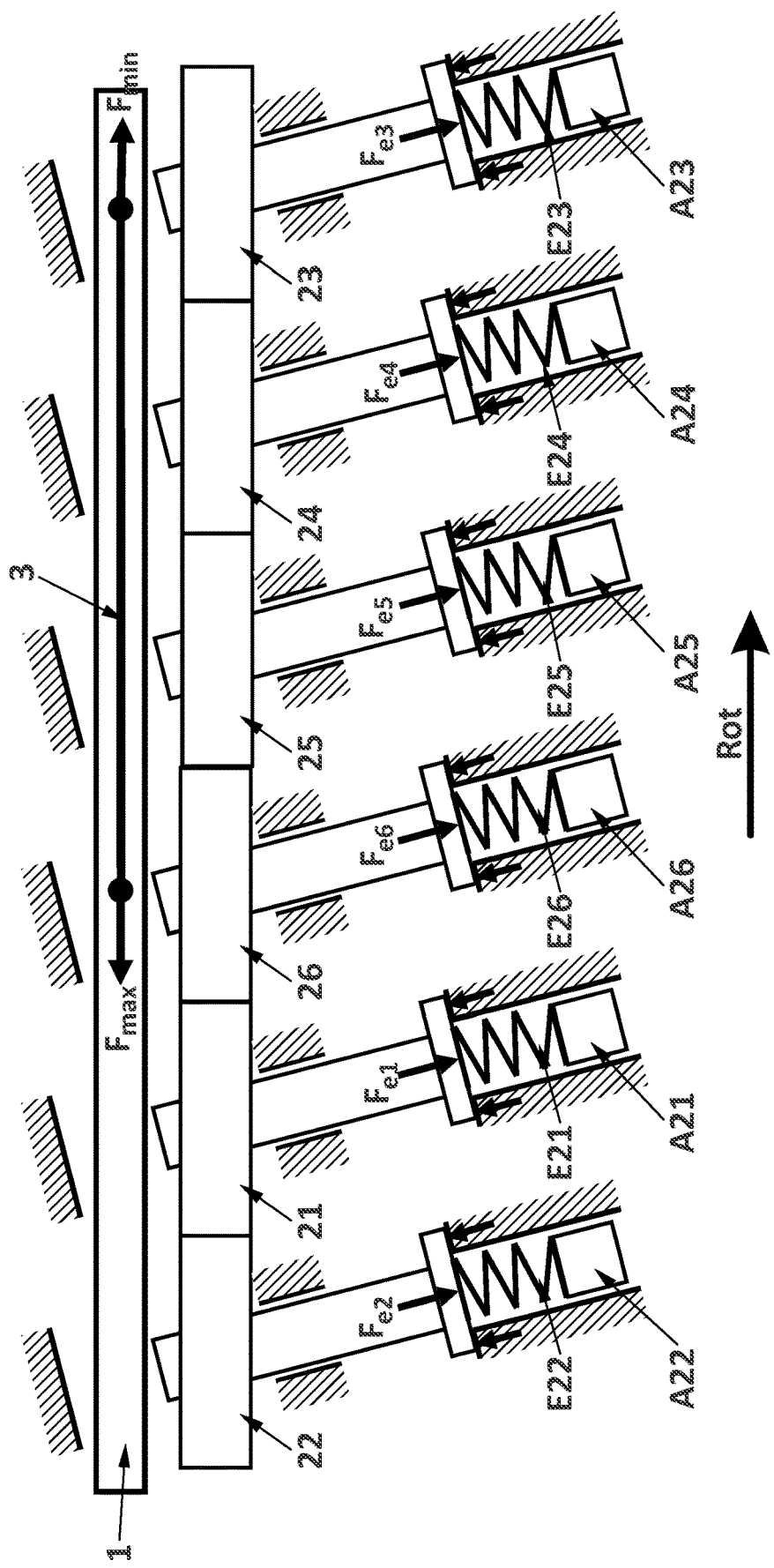
FIGS. 15A to 15D show the inverse process.
Figure 15B:
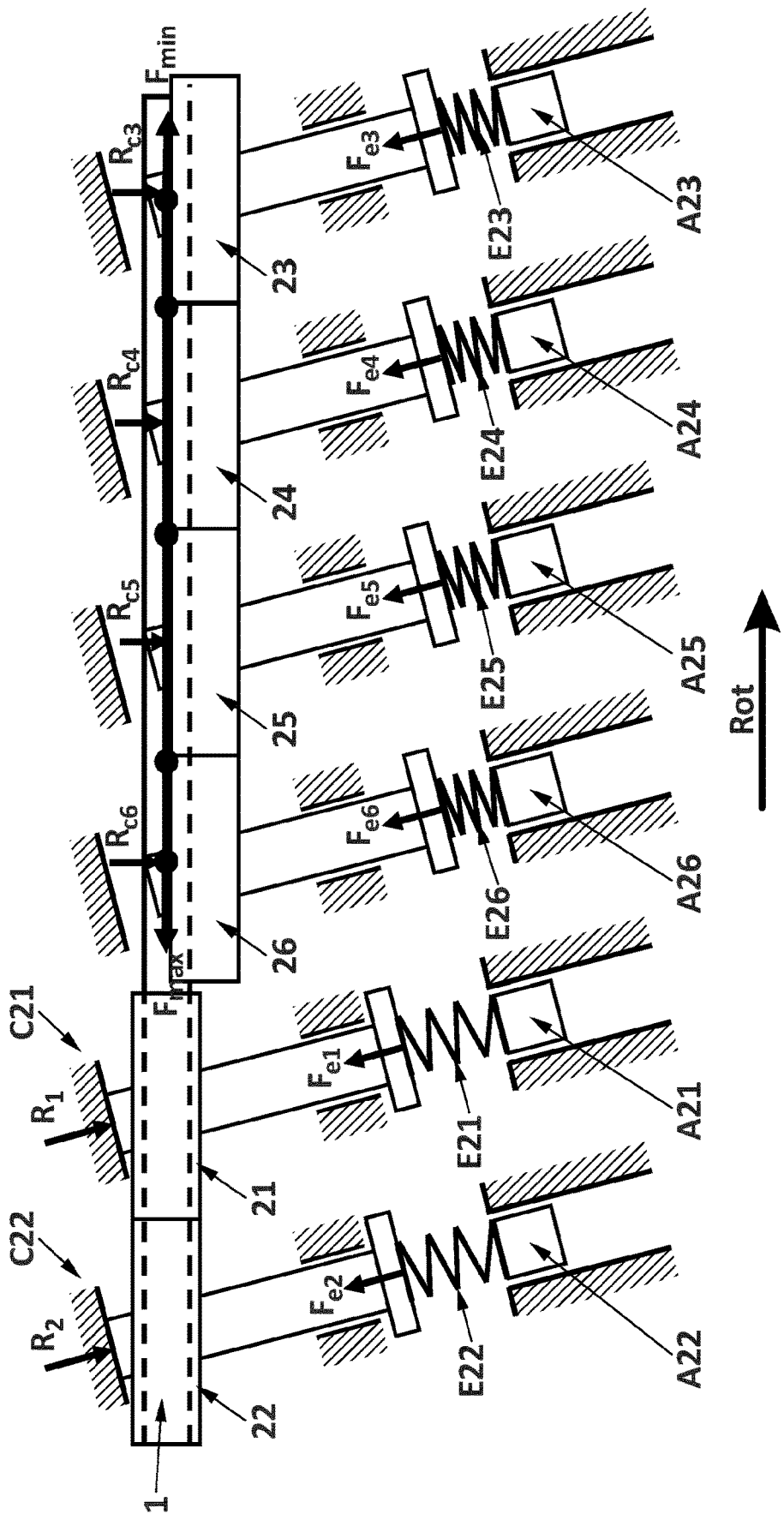
Figure 20:
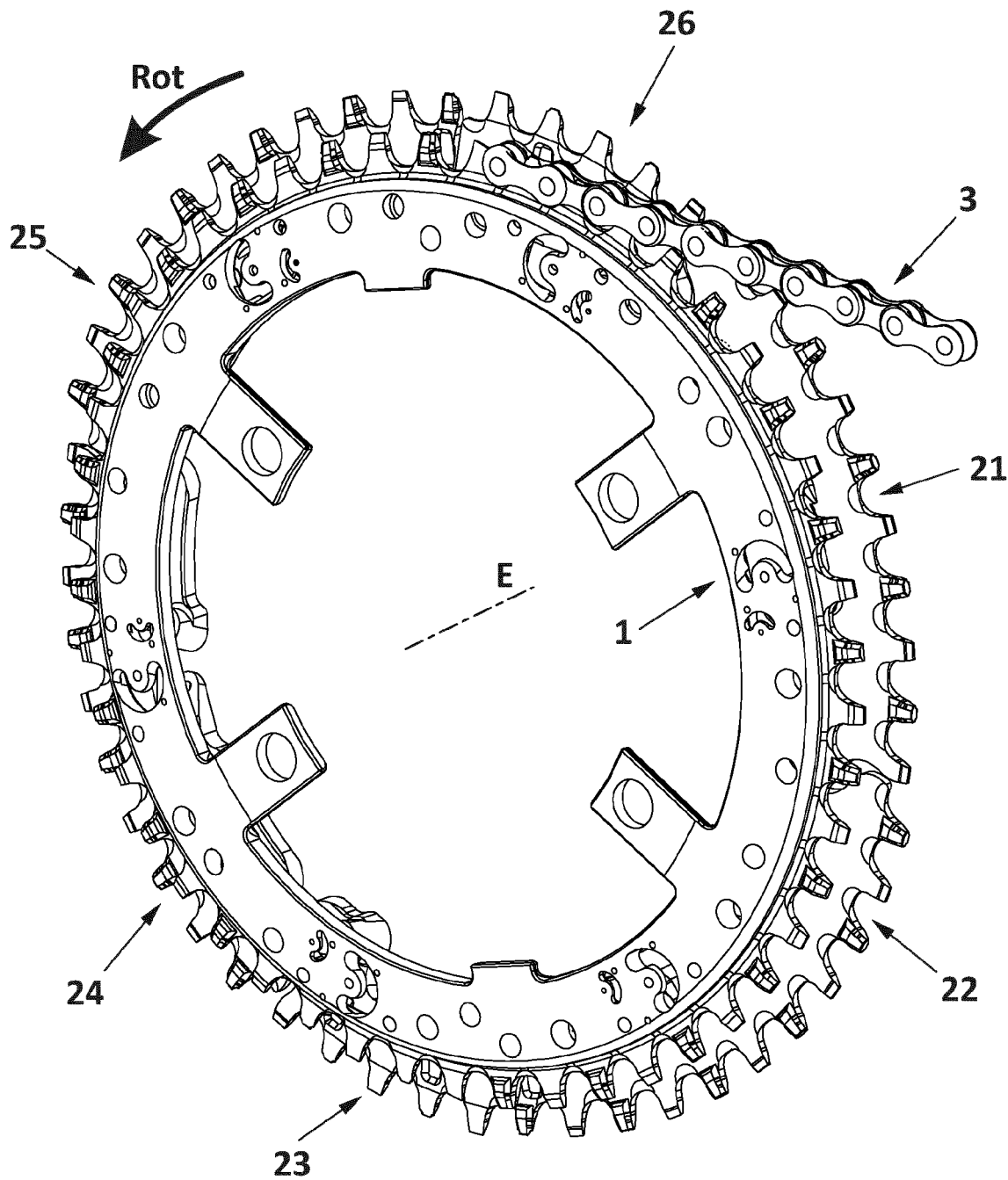
FIG. 20 shows the set composed of a small chain-ring, a big chain-ring and a chain in the configuration wherein the power is transmitted through the small chain-ring.

Therefore, for each segment 21, 22, 23, 24, 25, 26 at least two configurations are defined:

a first configuration in which the segments 21, 22, 23, 24, 25, 26 are in a first position away from the first chain-ring 1 in the direction of the axis E and in which the chain 3 can engage with the first chain-ring 1 without interference of the segments 21, 22, 23, 24, 25, 26, as shown for example in FIGS. 14D, 15A and 20, and a second configuration in which the segments 21, 22, 23, 24, 25, 26 are closer to the first chain-ring 1 in the direction of the axis E than in the first configuration and in which the chain 3 can engage with the second chain-ring 2, as shown in FIGS. 12, 14A, 15D and 22, for example.

Figure 16:
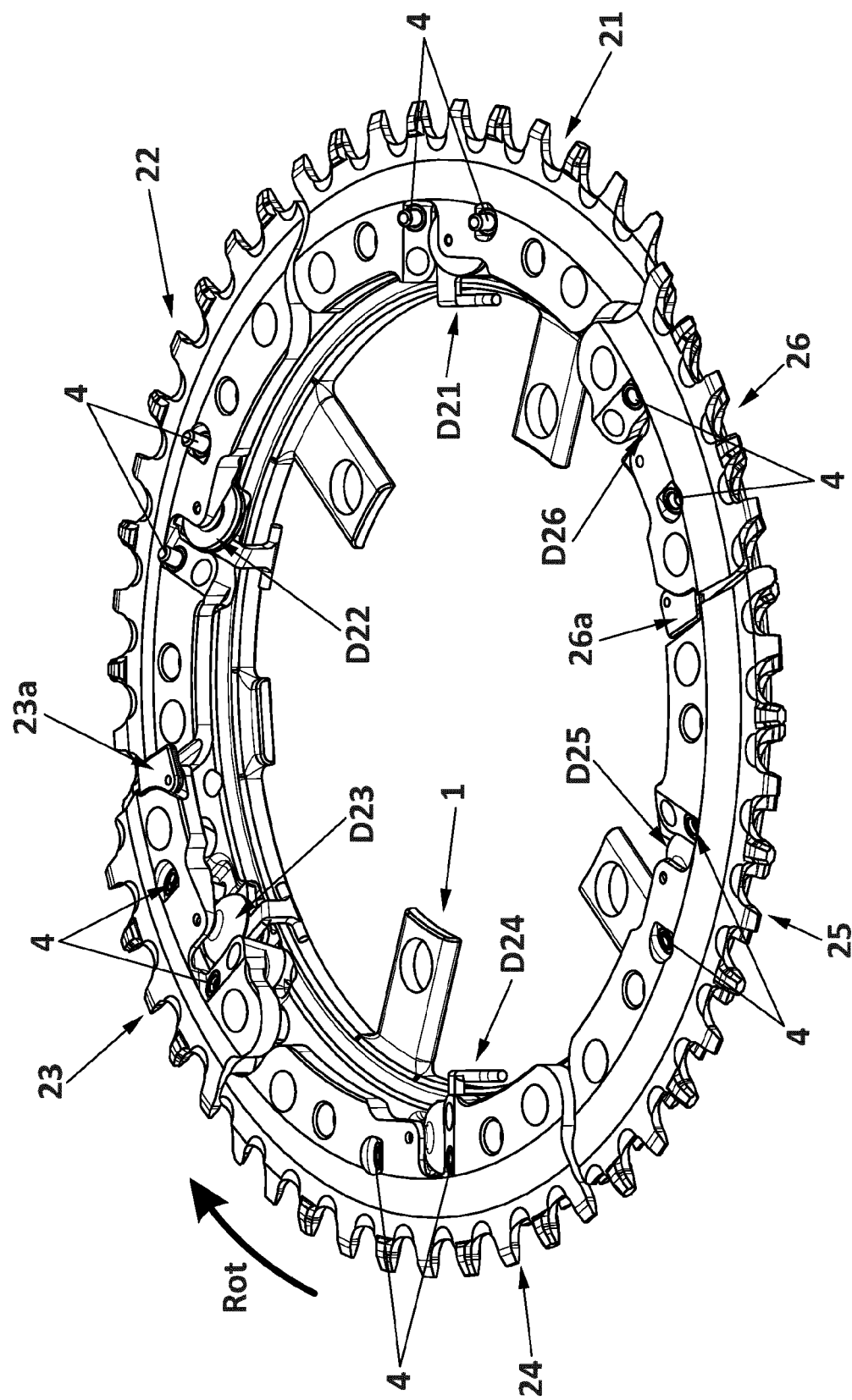
FIG. 16 shows a perspective view of a set according to the disclosure.

The axial displacement means are formed by guiding means 4 and drivers, D21, D22, D23, D24, D25, D26, shown in FIG. 16. In order to identify the components of the different segments, the letter assigned to the component followed of the reference of the segment to which they belong will be used. For example D21 is the driver of the segment 21.

Figure 4:
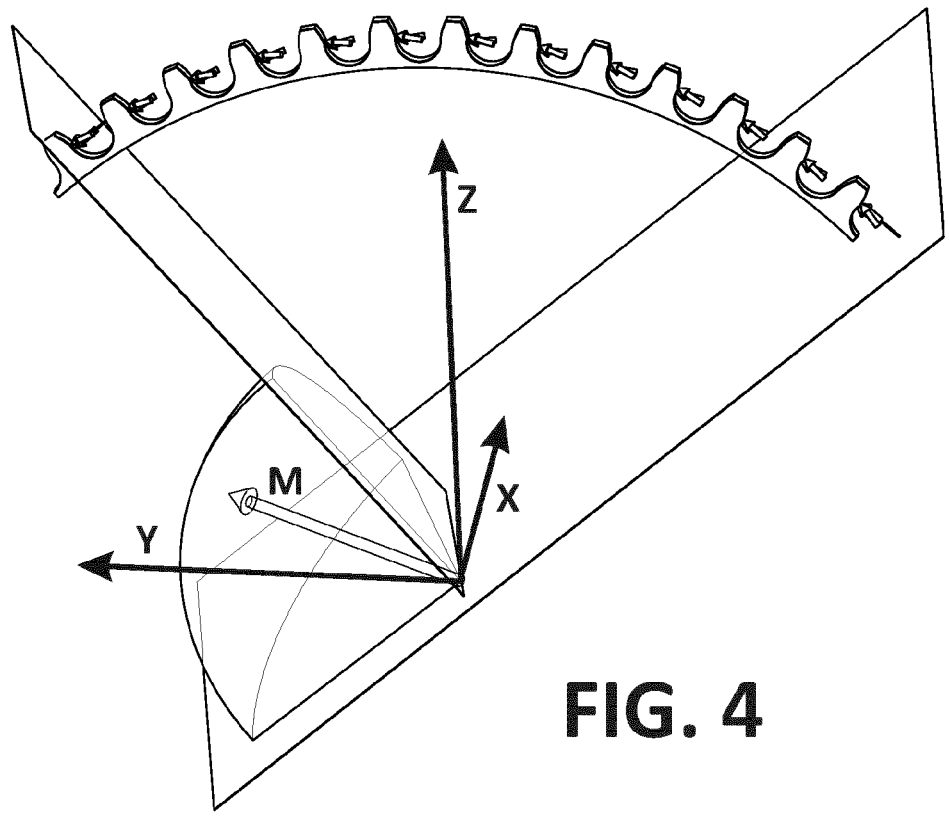
FIG. 4 shows the quadrant, regarding sense and direction, wherein the guiding vector between segments and small chain-ring must lie.

According to the disclosure, and as shown in FIGS. 4 and 16, the guiding means 4 are configured for guiding the segments 21, 22, 23, 24, 25, 26 such that the relative movement of each tooth of the segments 21, 22, 23, 24, 25, 26 with respect to the first chain-ring 1 in its displacement from the first configuration to the second configuration has a tangential component having the sense de la traction of the chain 3.

Figure 3:
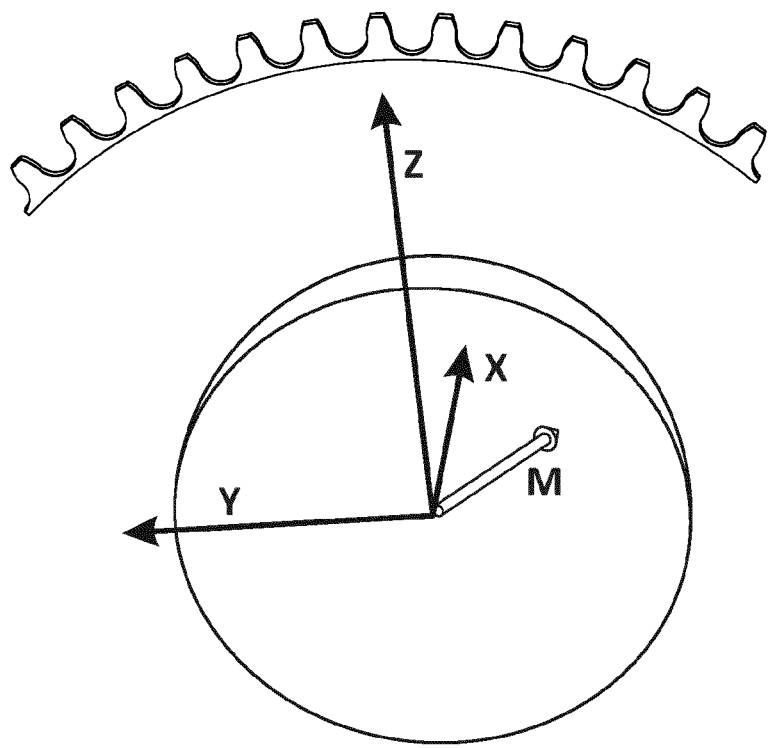
FIG. 3 shows the vectors range having an axial component for displacing the segments from the first configuration to the second configuration.

Below, the essential concept of the disclosure will be described by means of the figures. First, a coordinates system will be established. As shown in FIG. 3, a coordinates system is defined in each segment so that:

The axial axis X corresponds with the axis E common to the two chain-rings 1, 2, the positive direction being the one towards the bicycle.

The radial axis Z is defined from the axial axis X in the plane of the chain-ring with its direction towards the centre of the segment, when it is in the second configuration, and with positive direction towards the exterior. The radial axis Z is perpendicular to the axial axis X.

The tangential axis Y is perpendicular to the other two axis X and Z, and its direction is positive in the opposite direction to the movement of the chain in the entry in the chain-rings.

Such as the three axis have been described, they constitute a trihedron with the usual orientation, the right-hand rule.

Therefore, the displacement as a solid rigid of the segments 21, 22, 23, 24, 25, 26 with respect to the first chain-ring 1 between the first and second configuration can be defined by three displacement vectors and three rotation vectors according to the axial X, tangential Y and radial Z axis.

The movement vector M of the segments 21, 22, 23, 24, 25, 26 with respect to the first chain-ring 1, when in the second configuration, has a component in the tangential direction such that a force applied by the chain 3 on the segment implies the movement in direction M such that it has a component in the axial X direction implying a displacement force of the segment 21, 22, 23, 24, 25, 26 from the first configuration to the second configuration. In more detail, the movement vector M in the contact of any tooth with the chain 3 must have a tangential component such that the force of the chain 3 over that tooth implies the movement of the segment 21, 22, 23, 24, 25, 26 in the direction M that implies an axial component X.

The relative displacement of the segment between the first and second configurations can be a translation that can be decomposed in three translation components with respect to the axis X, Y and Z. It also can be a rotation, which can be decomposed into three rotation components with respect to the axis X, Y and Z, or be a translation movement plus a rotation in a screw way, that can be decomposed in the 6 aforementioned degrees of freedom, or a more complex trajectory movement.

In the case of a translation movement of the segment, the movement vector M will be the same in all the teeth and in the whole the segment. In FIGS. 3 and 4, the group of admissible movement vectors M is geometrically delimited when the segment displaces through translation. In the case of another type of movement, each tooth will have a different movement vector M and will have to be analysed tooth by tooth, but using similar concepts as the ones disclosed below.

At the moment of shifting from the first chain-ring 1 to the second chain-ring 2, from the first configuration to the second configuration, the segment has to be displaced towards the first chain-ring 1, and therefore the translation vector M has to have, at least, one component in the positive sense of the axial axis X. In other words, any displacement vector inside the semi-sphere of FIG. 3 would be valid.

FIG. 4 shows the force vectors of the chain 3 impacting the segment in different moments or situations, for example, engaging in different rear sprockets, and for each one of the forces (even if FIG. 4 only shows the corresponding to the more extremes forces) a perpendicular plane to these forces passing through the origin (centre of the segment) is defined. Each plane cuts the semi-sphere from which it will only remain the portion in which the movement vectors have an angle less than 90° with the force vector in question, such that the semi-sphere of FIG. 4 is obtained (in this case this semi-sphere is obtained only with the cut corresponding to the planes de the most extreme forces, because the other planes do not impact in this resulting semi-sphere). This way, the semi-sphere in FIG. 4 limits the movement vectors in the final state so that any force of the chain 3 applied over the segment implies a movement in the positive direction of approximation to the first chain-ring 1.

FIG. 4 shows that the displacement purely axial in the axis X as in patents CH-617992-A5 and US-2014/0248982-A1 do not guarantee that all the applied forces imply a positive displacement towards the first chain-ring. For that purpose, it is essential for the displacement vector of the segment to have a tangential component, at least, at the final moment of the displacement towards the first chain-ring 1.

Figure 5:
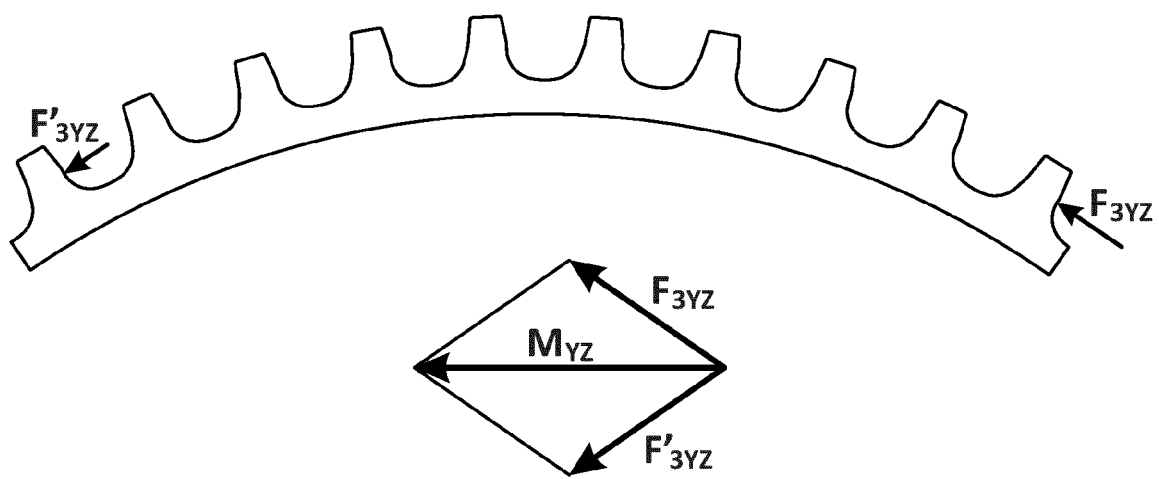
FIG. 5 shows the end points of the segments where the force of the chain can be applied.

Among all the movement vectors M complying with the conditions, a preferred plane of vectors can be delimited that corresponds to a vector Myz in the plane YZ which is the vector sum of the components in the plane YZ of the vectors of the chain forces in the end teeth F3YZ and F'3'YZ as shown in the FIG. 5. In this way it is obtained that la projection of both end forces on the movement vector is equal, such that in both cases the chain forces tend to move the segment from the first configuration to the second configuration with the same force.

The forces of the chain in any other tooth of the segment will have a major component over the movement vector, such that the force for displacing the segment from the first configuration to the second configuration will be even better. In comparison, any movement vector M out of the plane delimited will imply a smaller projection component of one of the two end forces. Therefore, in these conditions the displacement force provided by the chain 3 will be lower and the system will be less efficient. For this reason, the movement vectors M having a projection in the plane YZ close to the vector Myz are preferred.

Each one of the segments 21, 22, 23, 24, 25, 26 and the first chain-ring 1, or a part 1' solidary to the first chain-ring 1, comprise constraint means 6, C21, C22, C23, C24, C25, C26 that in the second configuration integrally transmit the traction force of the chain 3 to the first chain-ring 1, or to the part 1' solidary to the first chain-ring 1, while no exerting opposition forces to the drivers forces D21, D22, D23, D24, D25, D26 when the segments 21, 22, 23, 24, 25, 26 are stresses to bring them from the second configurations to the first configuration.

These constraint means 6, C21, C22, C23, C24, C25, C26 must create at least three mutually supporting points between each one of the segments 21, 22, 23, 24, 25, 26 and the first chain-ring 1, or the part 1' solidary to the first chain-ring 1, when these are in the position more close to the first chain-ring 1, i.e. in the second configuration.

The reaction normal to the surface, or constraint means 6, C21, C22, C23, C24, C25, C26, in these three points must support any force applied by the chain 3 on the segment 21, 22, 23, 24, 25, 26, thus securing the relative position between the segment 21, 22, 23, 24, 25, 26 and the first chain-ring 1. This securing will be better when higher are the transmitted force, resulting in a stable and efficient structure when transmitting power, as shown for example in FIGS. 6 and 7. The higher the force of the chain F3, the higher the reactions R6 will be.

Transmitting high forces will entail the deformation of the contacting surfaces, so that the contact will occur in areas which will be greater the greater the force, since the solids are deformable. To facilitate the transmission of forces through an area as large as possible at the points of contact, and avoid stress concentration, it is possible to conceive the three contacts between mating surfaces, flat or not, rather than three points, as for example in FIGS. 6 and 7. In the case of non-planar surfaces with normal vectors of variables direction, it is possible to have more than one initial contact point in a contact surface in the state without loads. Indeed, one spherical surface for example could provide the three points needed for the contact without loads, and that only surface, even in different areas thereof, would convey all reactions to the operating forces.

In practice, through adjustments and tolerances, the contact in these surfaces will occur at a point in a state without load, i.e. isostatic support, but when transmitting forces, even if they are low, the surfaces are deformed and the support is produced in large part of this area. When designing these contact surfaces, it should be kept in mind that the transmission of forces between the surfaces (deformed or not) is to be performed in a direction whose projection on the motion vector M does not have the sense of movement from the first configuration to the second one, which means that these surfaces will not oppose the displacement of the segment from the second configuration to the first. In the event that force is transmitted in a direction perpendicular to the movement, these surfaces guide the movement. An example of this case would be for example the guiding means 4 of FIG. 7. In all other cases, the contact surfaces are separated as they are moving from the second configuration to the first configuration, i.e. not opposed surfaces, leaving freedom to move between the two configurations. This is the case of conical contact surfaces shown in FIGS. 8 to 11, which are a particularly preferred choice.

Another important feature in the transmission of forces between the segment 21, 22, 23, 24, 25, 26 and the first chain-ring 1 is the spatial placement of three contact points or surfaces, because depending on this the reaction forces are higher or lower. Here, to reduce reactions, or transmitted tensions between elements, it is preferable that contact occurs at a radial position next to the primitive line of the teeth which is about where the force of the chain F3 is applied.

Figure 6:
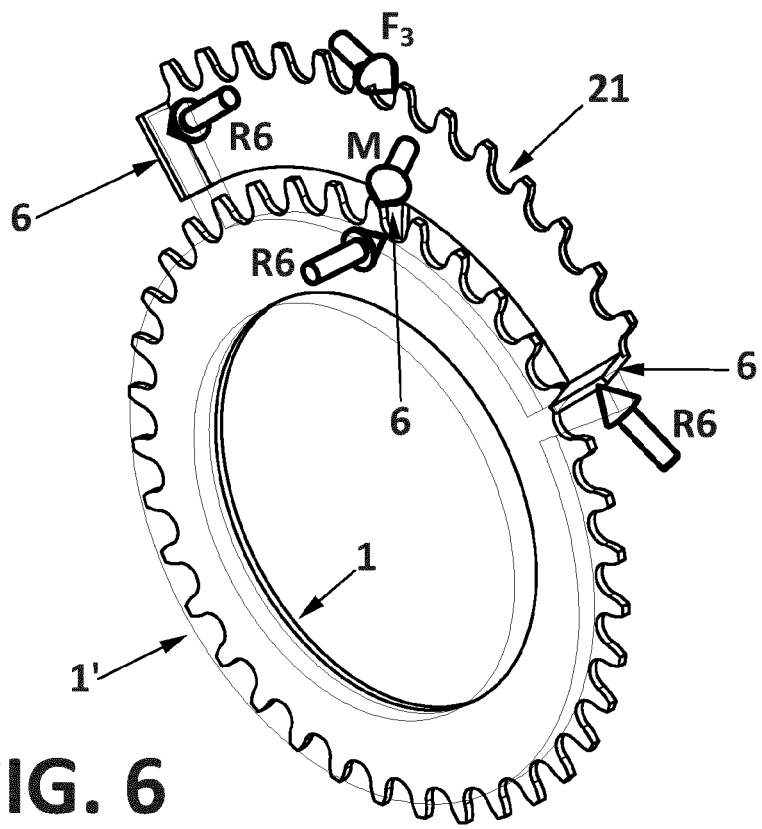
FIGS. 6 and 7 show the forces of reaction between chain-rings or between segment and solidary intermediate structure to the small chain-ring.

In FIG. 6 a set in which the segment 21 is supported on a support part which is not the first chain-ring 1 but is an integral part 1' of the first chain-ring 1, also called rotational fixed part 1'. The support occurs in the constraint means 6 at the ends of the segment 21 in an area next to the teeth and the axial constraint means 6 in the central part, so that each of these constraint means 6 of the ends will be able to cope with the force of the chain 3 when this is next, without generating high reactions on the other points of contact or constraint means 6.

On the other hand, in forces applied on the central section of the segment 21, this force is effectively divided between both constraint means 6 of the ends with little impact on the central constraint means 6. The central constraint means 6 has the primary mission of addressing the axial forces toward the first chain-ring mainly due to the axial component of the forces of the chain 3 when it is engaged with a large chain-ring. Therefore, these forces will be lower than those affecting the supports at the ends. Thus, the configuration of FIG. 6 is quite effective to transmit the forces of the chain 3, but otherwise is not very suitable for transmitting other forces such as vibration, in other directions. On the other hand, due to the position of the constraint means 6 a wide displacement of the segment 21 from the second configuration to the first configuration is necessary so that the chain 3 can engage on the first chain-ring 1, without interfering with these constraint means 6.

Figure 7:
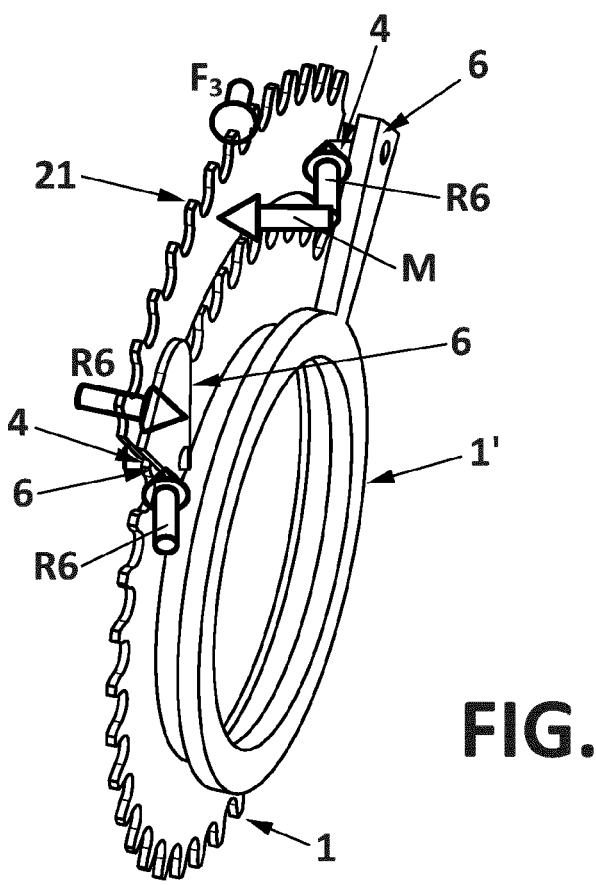

FIG. 7 shows that the constraint means 6 of the ends are made by cylindrical surfaces which provide stability for the chain 3 forces and any other force in another direction. Since they are cylindrical they also fulfil the task of guiding means 4 and facilitate that the segment 21 can move toward the side of the constraint means 6, so that the segment 21 needs less displacement to leave enough space for the chain 3 to engage with the first chain-ring 1, and so a more compact system can be made.

In FIG. 7 are also observed two options to arrange these guides: near the teeth on the integral part 1' of the first chain-ring 1, so that the forces to this structure are transmitted more effectively; and the other more compact position resting directly on the chain-ring 1 without intermediate structures. The reaction forces will be lower in the first one since they are closer to the primitive diameter of the second chain-ring 2, although these reactions will have to be then transmitted from the integral part 1' to the first chain-ring 1, which adds complexity. The optimal solution would be for chain-rings structurally very similar in size as in FIG. 11 where the support could be made in the first chain-ring 1 without this support being away from the primitive line of the teeth of the second chain-ring 2, where approximately the forces of the chain 3 impact.

Up to this point it has been considered that the surfaces are smooth so that there is no friction and the reaction force is always perpendicular to the contact surface. But in practice there will be a friction component all across the contact surface that makes the reaction force not always perpendicular to the surface, which has its effect on the transmission of forces between the segments 21, 22, 23, 24, 25, 26 and the first chain-ring 1, and therefore when arranging the constraint means 6, and also affect the motion vectors M permissible to stabilize the system.

When analysing the forces and reactions at the contact points, it is necessary to consider the frictional force on the constraint means 6, C21, C22, C23, C24, C25, C26, which generally provide better stability to the segment 21, 22, 23, 24, 25, 26 in the second configuration, which is an additional guarantee, although it will difficult the displacement in the shift from this second configuration to the first one. Because of the stability provided by the friction, it is even allowed to take out the motion vector M of the segment of the hemisphere in FIG. 4 that defines its ideal range in an amount equivalent to the angle of friction (tangent angle of the friction coefficient) and still maintain a stable position against the forces of the chain 3. In these cases, the forces of the chain 3 may tend to take out the segment 21, 22, 23, 24, 25, 26 of its stability position but not enough to overcome the frictional forces in the contact with the constraint means 6, C21, C22, C23, C24, C25, C26.

However, in this configuration another advantage of the motion vector M within the hemisphere of FIG. 4 is lost, which is that if for any reason the segment gets out of position even with the chain 3 engaged therein, the forces of the chain 3 will return it to its position, which is an additional guarantee of stability. To achieve this behaviour with friction, the allowable FIG. 4. hemispherical of motion vectors M could be closed, as for the friction angle, so that the repositioning force caused can overcome the friction force in the constraint means 6, C21, C22, C23, C24, C25, C26, which will attempt to maintain the segment in the position where it has been left, and return the segment to the position where it should be.

As shown in FIGS. 8 to 11, the constraint means 6, C21, C22, C23, C24, C25, C26 comprise at least two frustoconical protuberances 61 in each one of the segments 21, 22, 23, 24, 25, 26 or in the first chain-ring 1 and two complementary openings 62 in the first chain-ring 1 or in each one of the segments 21, 22, 23, 24, 25, 26 respectively.

Friction effects are most noticeable in designs in which the constraint means 6 correspond to guiding means 4 as in the FIG. 7, in which the friction forces in the constraint means 6 are manifested at all times between the two configurations, unlike configurations as those of FIG. 6, 8, 9, 10 or 11 wherein the friction forces in the constraint means 6 are only present in the second configuration. In this regard, designs as those of FIG. 7 may have more problems of wear, roughness, or unreliability, so friction is an aspect that should be avoided to the maximum.

Figure 8:
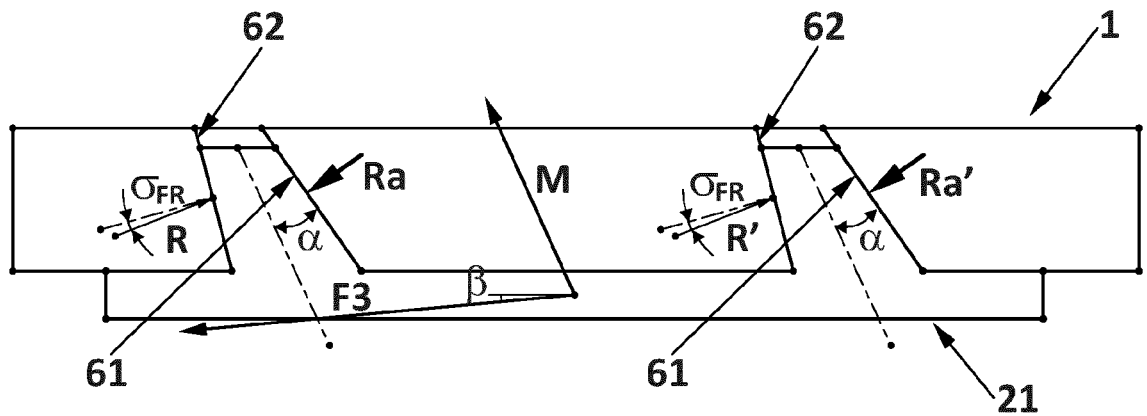
FIGS. 8 to 10 show a section of the constraint and blocking means between segments and chain-ring.
Figure 9:
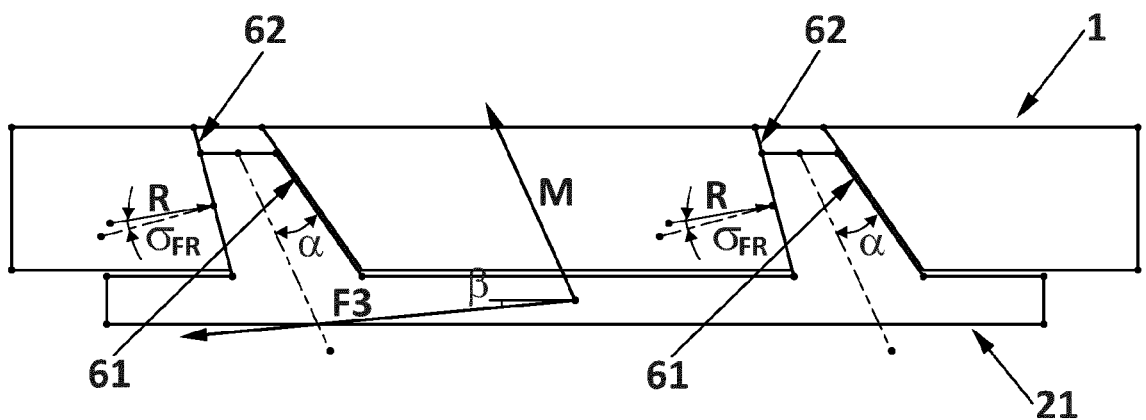
Figure 10:
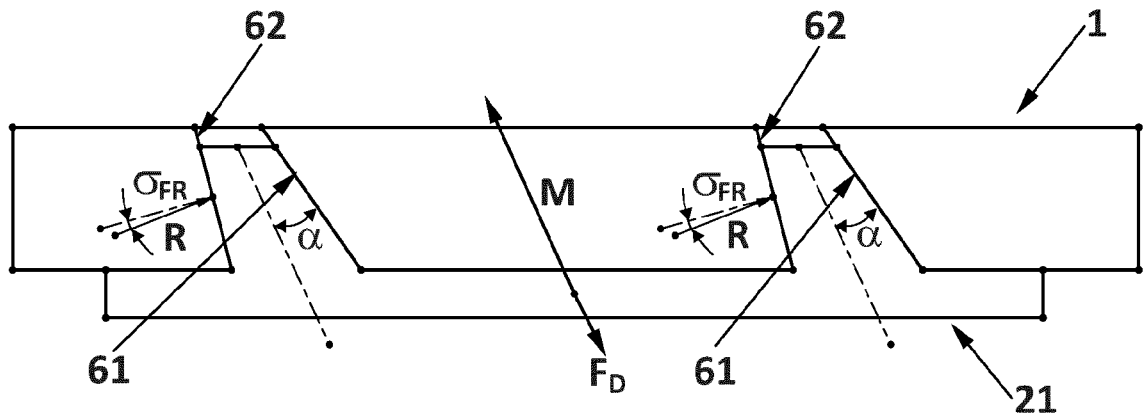

In FIGS. 8, 9 and 10 it is shown the optimal axial component of the movement vector M to avoid the effects of friction in the preferred solution wherein the constraint means 6 are made of frustoconical protuberances 61 and complementary openings 62.

FIG. 8 shows the extreme condition transmission (in combination with small rear sprockets) of the force F3 by the chain 3, resulting in reaction forces R and R' in the constraint means 6 (frustoconical protuberances 61 and complementary openings 62) and also the lower axial reactions Ra and Ra' which balance the system and prevent any movement. In this regard, the frictional forces that shift the reaction R according to the angle $\partial_{FR}$ respect to the direction normal to the surface assist in stabilizing the set against disturbances.

If the segment 21 is removed from its position, the force F3 of the chain 3 will return it to his position, as shown in FIG. 9, although the frictional force on the constraint means 6 opposes it, moving the R reaction according to the angle $\partial_{FR}$ respect to the normal direction to the surface, since the sum of F3, R and R' still remains a vector with a positive component in positive direction of the movement vector M which moves the segment 21 towards the second configuration.

On the other hand, as shown in FIG. 10, even with the effect of friction the reactions R and R' of the constraint means 6 fail to generate a resisting force in M direction so that the force of the driver FD is able to freely move the segment 21 from the second configuration to the first one.

As shown in FIGS. 8, 9 and 10, use of two cones as constraint means 6 is effective both in transmitting the force as when making the shift. But this requires fulfilling certain requirements:

Cones and conical holes must have a good surface finish to reduce friction in sliding and ensuring the transmission of forces over a wide area without the need of high deformations of the elements that could lead to seizure of the union.

The axis of the cone is parallel to the motion vector M, to facilitate disengagement.

The cone angle α must be high enough to remove the cone from the hole along its axis without resistance, although previously high tensions have been transmitted by that union. In this regard, as seen in FIG. 10, the a angle must exceed the friction angle $\partial_{FR}$ so that the projection of the possible reaction forces R and R' do not have a component in the direction of the motion vector M, and therefore do not oppose the segment displacement towards the first configuration The angle of the motion vector M with respect to the axial axis X must be greater than the cone angle α plus the friction angle $\partial_{FR}$ plus the maximum angle towards the exterior of the force F3 β so that as shown in FIG. 9, the forces F3 of the chain 3 are capable of returning the segment to its engagement position against unintentional displacement thereof.

According to FIG. 8, the condition for optimum transfer of forces F3 of the chain 3 would be less demanding; in this case the angle of the vector of the movement M respect to the axial axis X must be greater than the cone angle α minus the friction angle $\partial_{FR}$ plus the maximum angle towards the exterior of the force F3 β.

Considering that to reduce collision problems between segments it is interesting that the displacement of the segments 21, 22, 23, 24, 25, 26 is mainly produced axially X, and thus also the travel required of the driver D21, D22, D23, D24, D25, D26, is reduced too, among all the possible configurations the motion vector M with greater axial component X that meets the above requirements will be chosen.

Thus, defining the axial component of the motion vector M, the motion vector M preferred is completely defined if we consider that the preferred Mzy projection had already defined above. In the preferred solution shown in FIGS. 11, 16 and 18, for example, the guiding means 4 of each segment 21, 22, 23, 24, 25, 26 are configured for moving according to this preferred movement vector M between the first and the second configuration.

Figure 19:
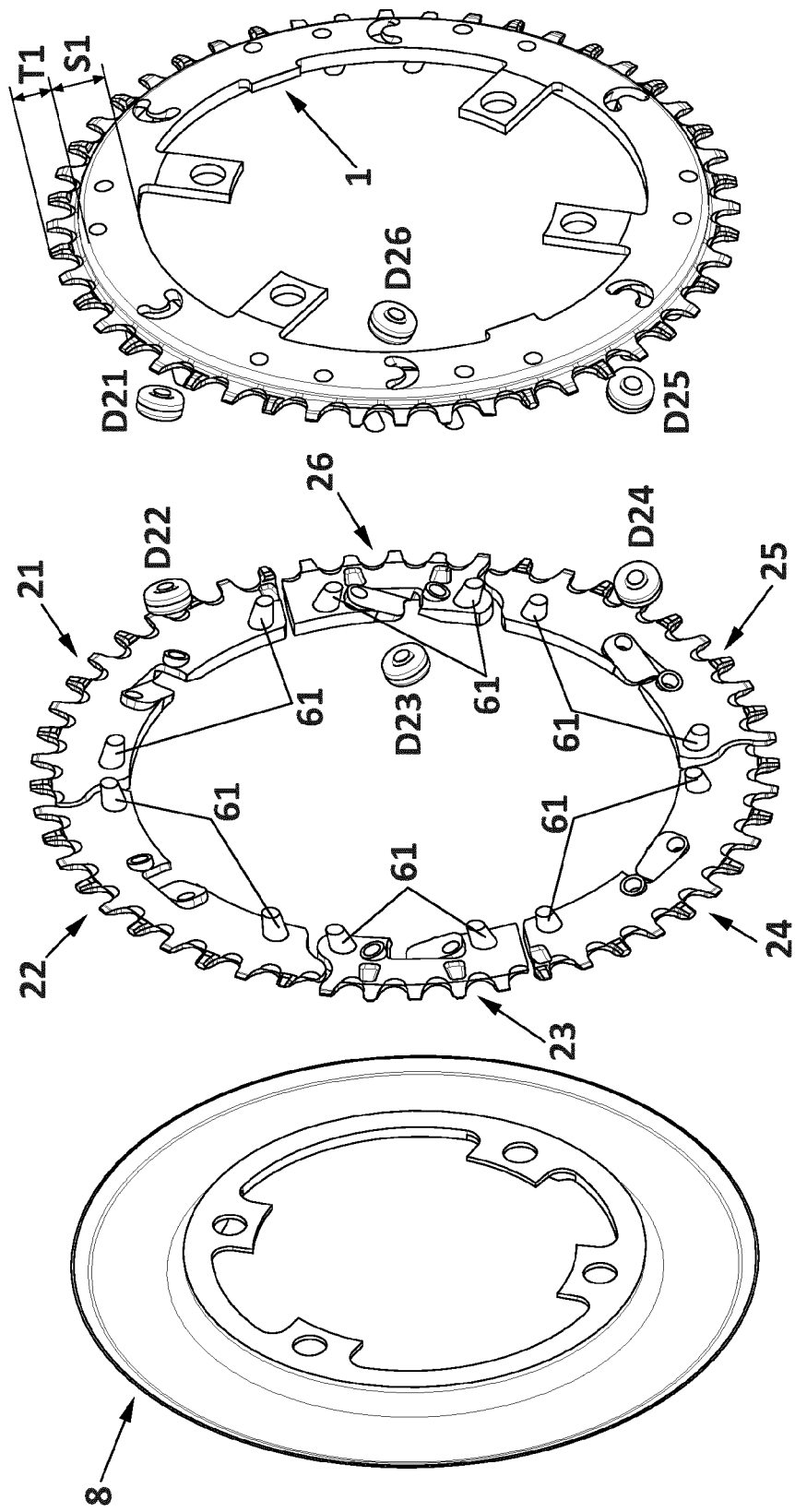

Beyond requiring precision manufacturing of the surfaces of the cones and tapered holes, a high precision in the relative positioning of the two frustoconical projections 61 and the two complementary apertures 62 is also required, such that the engagement of the segment 21 is carried out with smoothness and precision in the first chain-ring 1. The small misalignments that may exist shall be solved by small deformations of the elements. In this regard, it is preferable to separate the two frustoconical protuberances 61 as much as possible within the segment 21, 22, 23, 24, 25, 26 to facilitate these small deformations and therefore the alignment and coupling as shown in FIG. 19. Separating the constraint means 6, C21, C22, C23, C24, C25, C26 is also the optimal configuration to reduce reactions and get a better transmission of force.

As mentioned, it is also possible to conceive other constraint or support means 6, C21, C22, C23, C24, C25, C26 in the second configuration, for example at least three bearing surfaces in each of the segments 21, 22, 23, 24, 25, 26 and three complementary support surfaces for each of the segments in the first chain-ring 1.

Figure 18:
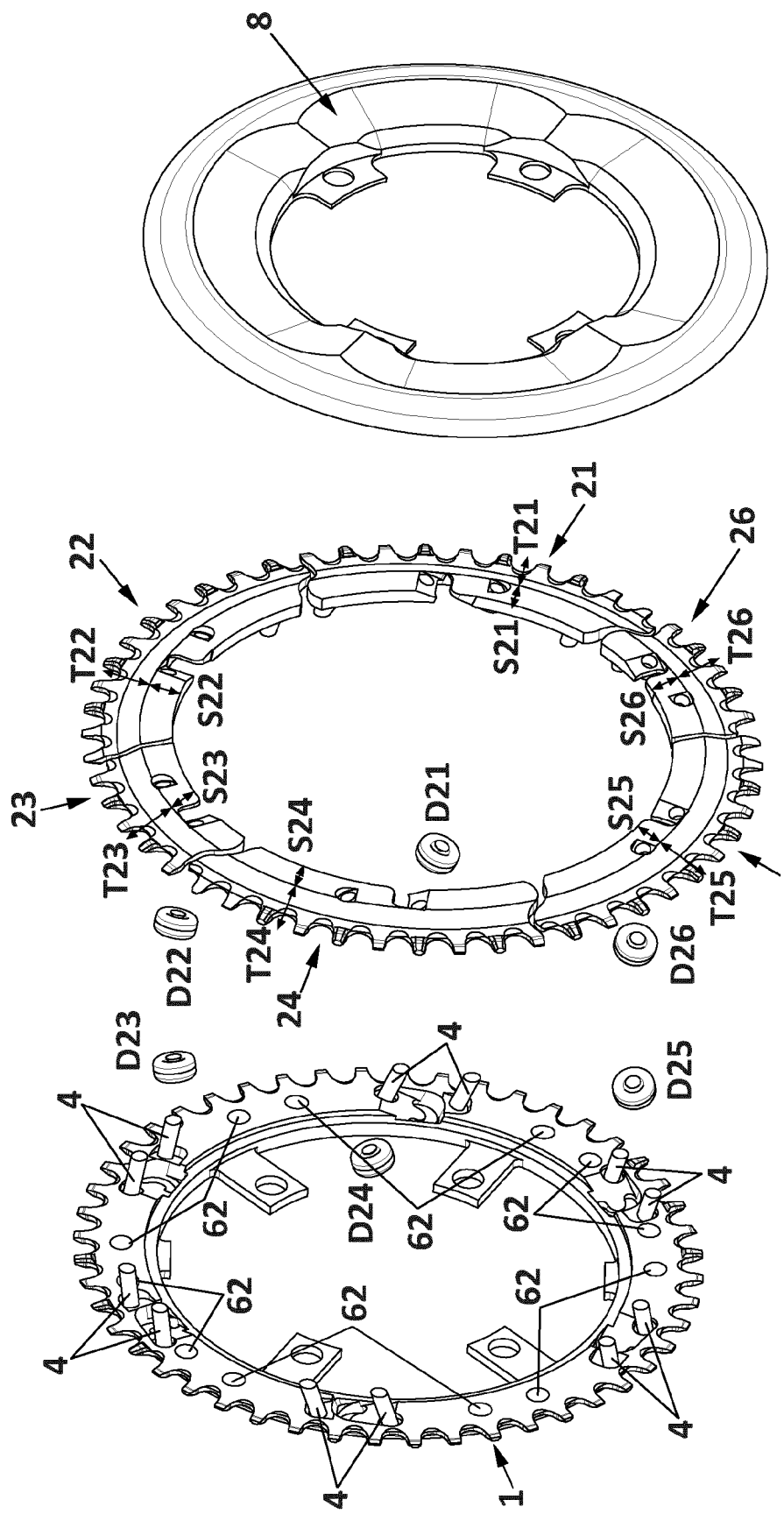
FIGS. 18 and 19 show an exploded view of the preferred embodiment.

As shown in FIGS. 18 and 19 the first chain-ring 1 is formed by a support part S1 of the teeth and a teeth part T1, wherein the second chain-ring 2 is formed by segments 21, 22, 23, 24, 25, 26 each formed by a support part of the teeth S21, S22, S23, S24, S25, S26 and a teeth part T21, T22, T23, T24, T25, T26, and wherein the guiding means 4 are configured to bring the support parts S21, S22, S23, S24, S25, S26 of the second chain-ring 2 in contact with the support part S1 of the first chain-ring 1, wherein the segments 21, 22, 23, 24, 25, 26 are circular crown sectors or oval crown sectors.

Figure 11:
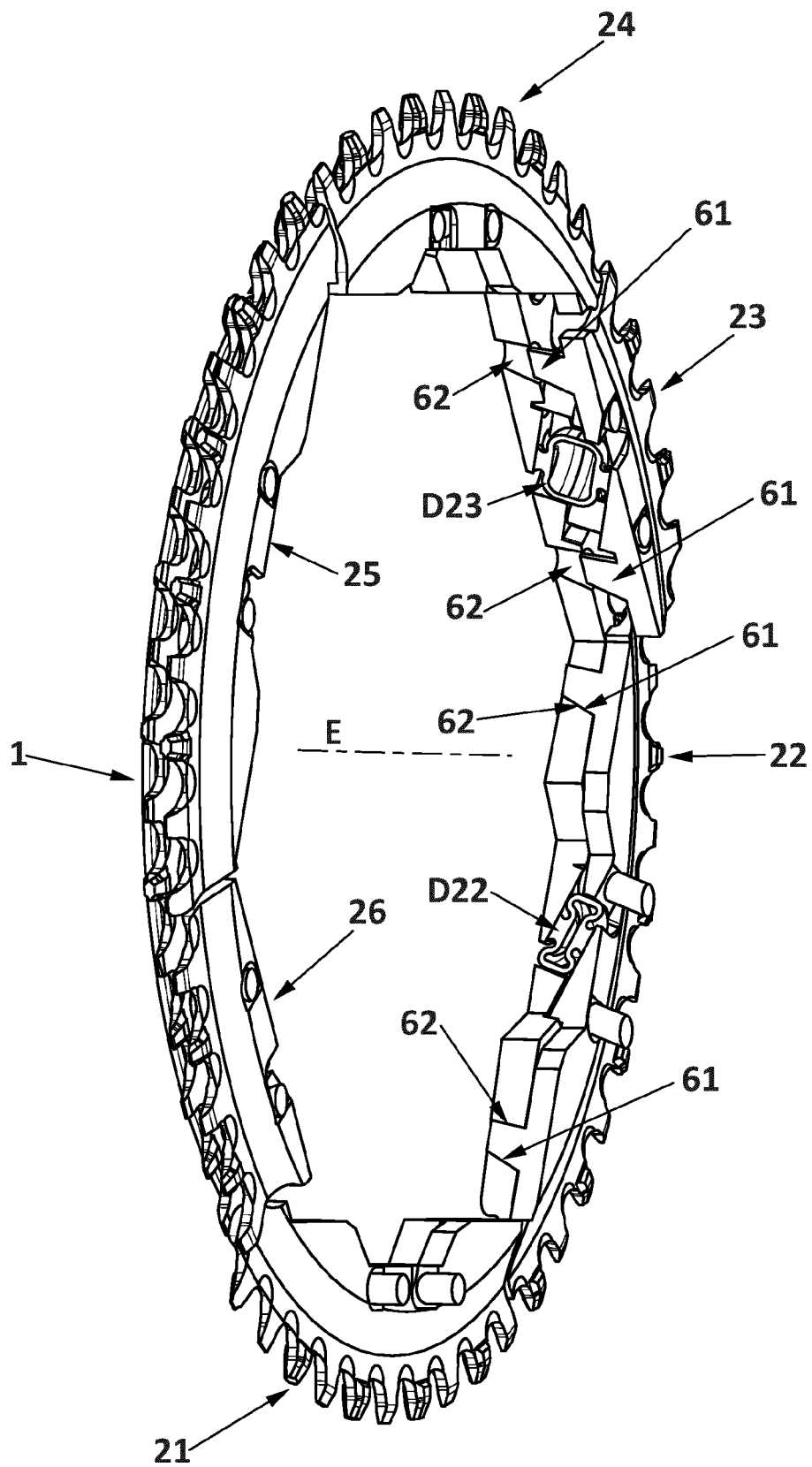
FIG. 11 shows a perspective partial cut of a preferred embodiment of the set.

As described above, using two chain-rings 1, 2 of similar size with the support in different planes so that the supports S21, S22, S23, S24, S25, S26 of the segments 21, 22, 23, 24, 25 26 can be supported directly on the support S1 of the first plate 1 has clear structural advantages when transmitting the efforts and get a very compact and lightweight structure such as illustrated in FIGS. 11 and 16.

Figure 1:
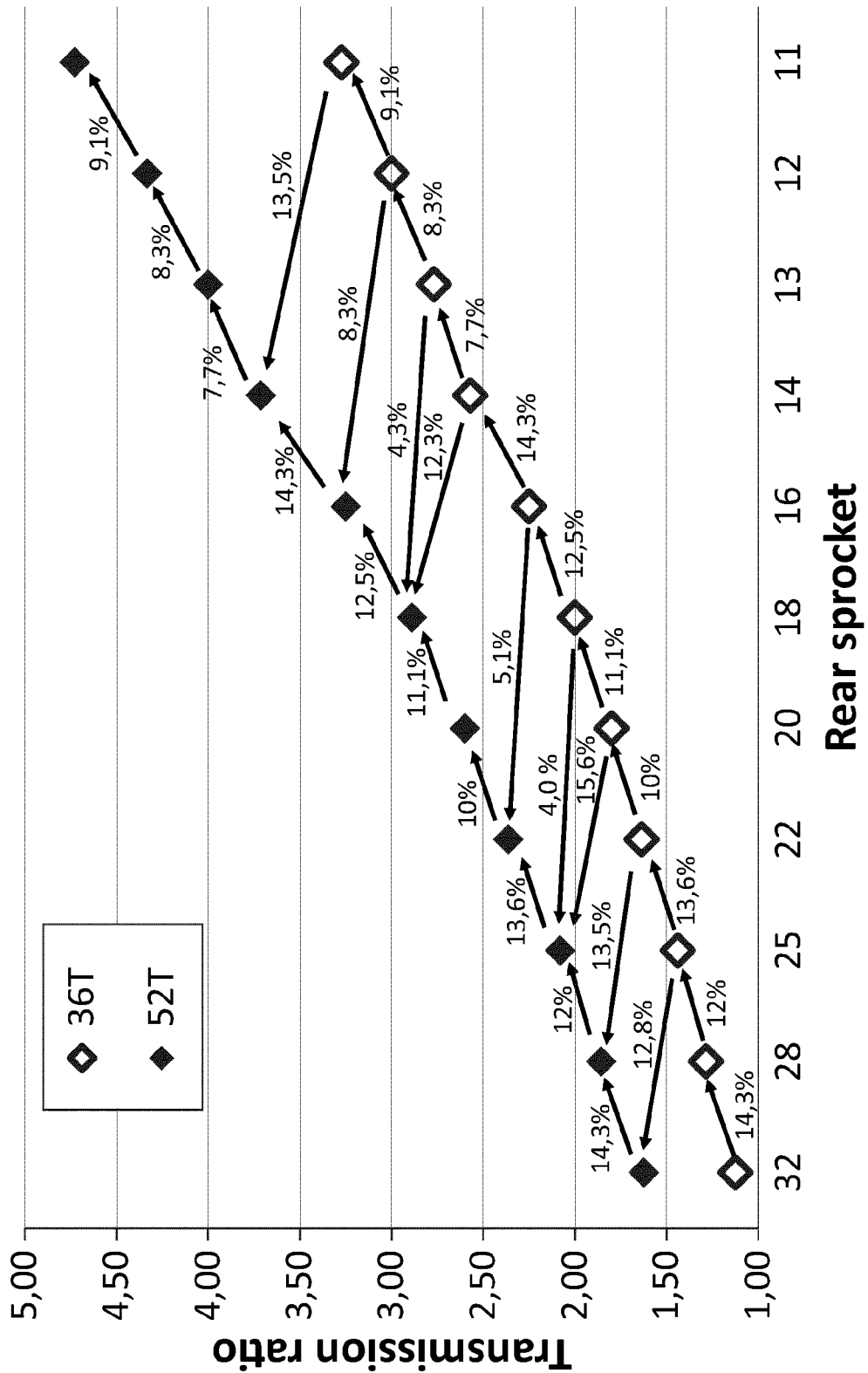
FIG. 1 shows the transmission relations and the shifting strategies mainly used in the state of the art.
Figure 2:
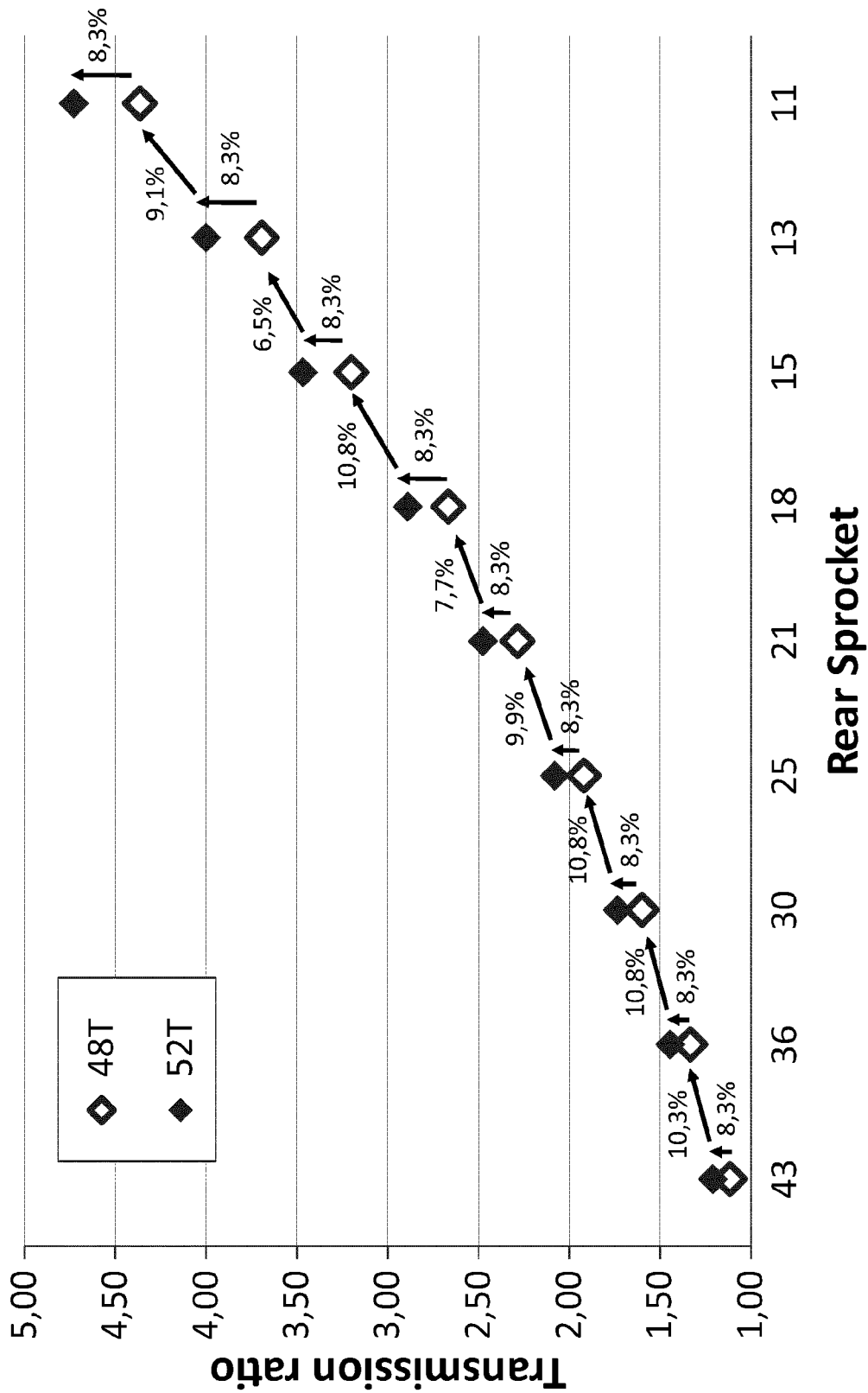
FIG. 2 shows the transmission relations and the strategy for shifting from the "half-step" that is proposed.

The smallest possible difference between chain-rings is four teeth, which is also optimal to adopt the half-step strategy that is better than the currently used. For example, with two chain-rings having 48 and 52 teeth, and 9 rear sprockets having 11 to 43 teeth, 18 relations are obtained, all useful that cover the same range than a common transmission of FIG. 1 but with jumps more uniform lying between 7,7 and 10,8% that have a better staggering of the transmission relations as shown in FIG. 2, and a more simple and clear shift logic, when compared with the strategies currently used. The "half step" strategy can also be advantageously employed in the context of teeth combinations of chain-rings such as 50-54, 46-50, 44-48, etc.

Direct contact between the support parts of the chain-rings 1, 2 allows to simplify the set. Specifically, in the document CH617992 the driver is structurally arranged between the segments and a common structure to which the first chain-ring is attached. That is, the forces are transmitted from segment to common structure and common structure to first chain-ring. This implies a higher structural complexity, tolerances, need for space for the drivers and relative positioning problems between chain-rings. The latter is essential for achieving shifting strategies optimized from the point of view of the smoothness and effectiveness.

As shown in FIGS. 12 to 15D, each segment 21, 22, 23, 24, 25, 26 has a driver D21, D22, D23, D24, D25, D26.

It is necessary to displace the segments 21, 22, 23, 24, 25, 26 one by one and preferably in the chain free zone ZLC shown in FIG. 12. To that end, each segment 21, 22, 23, 24, 25, 26 needs a driver D21, D22, D23, D24, D25, D26.

In FIG. 12 it is shown a schematic view of the first and second chain-rings 1, 2 viewed from the right part when the chain is engaged in the second chain-ring 2, which is formed by segments 21, 22, 23, 24, 25, 26, each one provided with a driver D21, D22, D23, D24, D25, D26.

To facilitate reading and interpretation of this description, the reference D21, D22, D23, D24, D25, D26 is assigned to the driver. Each one of the drivers is provided with an actuator A21, A22, A23, A24, A25, A26 and can also comprise an elastic element E21, E22, E23, E24, E25, E26. Each segment comprises a stop C21, C22, C23, C24, C25, C26 of the driver D21, D22, D23, D24, D25, D26 corresponding in general with the constraint means 6 previously disclosed. The actuator A21, A22, A23, A24, A25, A26 is a controllable element, whereas the elastic element E21, E22, E23, E24, E25, E26 is a passive element interposed.

Figure 13:
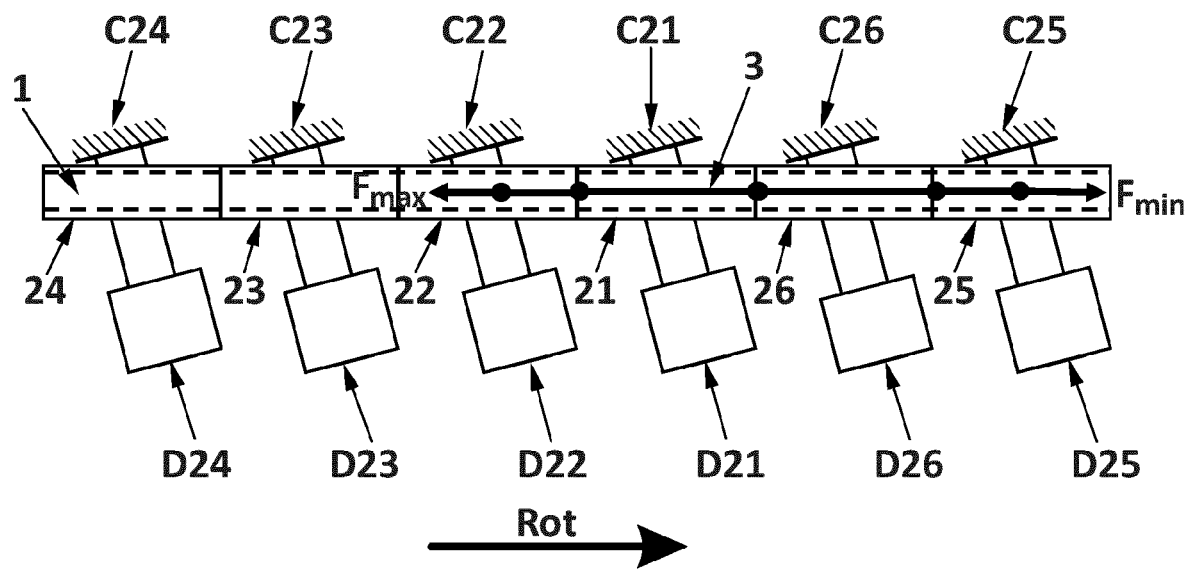
FIG. 13 shows a linear representation of the small chain-ring and the segments of FIG. 12 in plant view, in an engagement configuration of the chain in the big chain-ring, i.e. in the segments.

FIG. 13 is a linear representation of the circumferential elements from a top view to describe the operation of the D21, D22, D23, D24, D25, D26 drivers in the displacement processes of the segments 21, 22, 23, 24, 25, 26.

By linear representation it is understood that the segments 21, 22, 23, 24, 25, 26 have been represented as if they were unhooked at the junction between two successive segments, and they had been spread over the plane of representation, such as is done, for example, in linear representations of rotating electrical machines. Therefore, the ends of the first and last segments correspond to the same point.

In this embodiment, the chain 3 is shown only as a line in the area where it is in contact with the first or second chain-ring 1, 2.

An initial contact point and a final contact point between chain 3 and chain-rings 1, 2 are also represented, which are the points where the largest transfer of forces between the elements are performed. Thus in FIG. 13 shows how the actuators D21, D22, D23, D24, D25, D26 are pushing the segments 21, 22, 23, 24, 25, 26 against the stops C21, C22, C23, C24, C25, C26 of the first chain-ring 1 or the rotational fixed part 1', so that the segments 21, 22, 23, 24, 25, 26 are at their closest position to the first chain-ring 1, i.e. in the second configuration, and such that the chain 3 is engaged with the segments 22, 21, 26 and 25 as also shown in FIG. 12.

The actuators A21, A22, A23, A24, A25, A26 may be electrical, magnetic, hydraulic, pneumatic or otherwise. While the elastic elements E21, E22, E23, E24, E25, E26 may be a spring, a deformable structure, an elastomer, a volume of pressurized air, repellent magnets or any other element capable of storing energy when loaded and return it in their absence. For ease in interpretation in FIGS. 14A to 15D, the elastic element E21, E22, E23, E24, E25, E26 is represented as a spring, although it should be understood that it also represents any other type of elastic member.

The simplest driver mode would be one as illustrated in FIG. 13 wherein the drivers D21, D22, D23, D24, D25, D26 would not have elastic elements and therefore would be simple actuators A21, A22, A23, A24, A25, A26. In this case, in addition to handle the displacement of the segments 21, 22, 23, 24, 25, 26, the actuators A21, A22, A23, A24, A25, A26 can handle stabilizing the segments 21, 22, 23, 24, 25, 26 when the contact between the surfaces is not able to do it, that is, when facing forces not coming from the chain 3. These forces are not high, thus ensuring that the actuators A21, A22, A23, A24, A25, A26 do not have to respond to the forces of transmission, even a very compact and lightweight actuators can provide sufficient stability to the segments 21, 22, 23, 24, 25, 26 in other situations jointly with the guiding means 4 which could in some cases be even integrated in the actuator A21, A22, A23, A24, A25, A26 itself.

In this case, unlike the guiding of FIG. 7 (and guides used in the previous art), there is no need of a precise guiding without gaps, so some tolerance to reduce friction can be given. This is important to minimize the necessary forces from the actuator A21, A22, A23, A24, A25, A26. With a low-friction system where the major forces (power transmission) are transmitted by the structure, very compact actuators that require very little activation energy can be used, only that necessary to move the light segments 21, 22, 23, 24, 25, 26 at the desired speeds.

For this mode of operation is essential to have a position sensor indicating the position of the segments 21, 22, 23, 24, 25, 26 and that the control is able to decide the right time to activate each actuator A21, A22, A23, A24, A25, A26 to execute the process for shifting from the configuration of the chain-rings 1 and 2. Preferably, the segments 21, 22, 23, 24, 25, 26 are moved one by one into the free chain zone ZLC, although, as will be seen later, it could give the displacement order even if the segments remain engaged in the lower part, i.e. when they are about to enter the free chain zone.

In the FIGS. 14A a 15D, the drivers D21, D22, D23, D24, D25, D26 comprise an actuator A21, A22, A23, A24, A25, A26 and an elastic element E21, E22, E23, E24, E25, E26 arranged in series.

In FIG. 14A it is shown the transmission set in a representation similar to FIG. 13 wherein an elastic element E21, E22, E23, E24, E25, E26 has been interposed between the actuator A21, A22, A23, A24, A25, A26 and the segment 21, 22, 23, 24, 25, 26. The elastic element E21, E22, E23, E24, E25, E26 is represented as a spring in FIG. 14A to facilitate interpretation but as described previously it can also be any other elastic element such as a deformable structure, elastomer or rubber, pneumatic cylinder or repellent magnets, among others.

With the insertion of the elastic element E21, E22, E23, E24, E25, E26 the position of the actuator A21, A22, A23, A24, A25, A26 does not define directly the position of the segment 21, 22, 23, 24, 25, 26. The energy of the displacement of the actuator A21, A22, A23, A24, A25, A26, is accumulated in the elastic element E21, E22, E23, E24, E25, E26 which applies a force Fe1, Fe2, Fe3, Fe4, Fe5, Fe6 on the segment 21, 22, 23, 24, 25, 26.

If this force exceeds the other forces to which segment 21, 22, 23, 24, 25, 26 is subjected, it will move, otherwise, for example if the chain 3 exerts a force F3 on the segment 21, 22, 23, 24, 25, 26, the energy will remain accumulated in the elastic element E21, E22, E23, E24, E25, E26, until the situation of forces vary, and the segment 21, 22, 23, 24, 25, 26 can move. For example FIG. 14A, 14B, 14C, 14D, 15A, 15B, 15C and 15D show that the position of the segment 21, 22, 23, 24, 25, 26 does not always correspond with the position of actuator A21, A22, A23, A24, A25, A26.

Activate the actuators A21, A22, A23, A24, A25, A26 before the corresponding segment 21, 22, 23, 24, 25, 26 reaches the displacement zone is advantageous in terms of reaction speed. On the one hand the speed of the actuator A21, A22, A23, A24, A25, A26 is no longer important; whether the elastic element E21, E22, E23, E24, E25, E26 is loaded slowly or quickly, its unloading will be at high speed. On the other hand it ensures that this download or movement of the segment 21, 22, 23, 24, 25, 26 takes place as soon as possible. In the absence of elastic elements it is necessary to depend on the angle sensors to start the process, and due to uncertainty of measurement it is necessary to consider certain margins when acting that would slow down the shift.

In FIGS. 14A to 14D and 15A to 15D the shift processes between the first configuration and the second configuration in an operating mode are disclosed wherein all the actuators A21, A22, A23, A24, A25, A26 are actuated simultaneously.

FIG. 14A shows the final position in the second configuration wherein the actuators A21, A22, A23, A24, A25, A26 are in the second configuration, and the segments 21, 22, 23, 24, 25, 26 are in engaging position with the chain 3.

In this situation, the actuators A21, A22, A23, A24, A25, A26 are preloading slightly the elastic elements E21, E22, E23, E24, E25, E26 such that they apply a preload force Fe1, Fe2, Fe3, Fe4, Fe5, Fe6 on the segments 21, 22, 23, 24, 25, 26 which is counteracted by a force of reaction R1, R2, R3, R4, R5, R6 of the constraint means or support points C21, C22, C23, C24, C25, C26, so that this preload maintains the segments 21, 22, 23, 24, 25, 26 stable in the second configuration before vibrations or other external forces not coming from the chain 3, because as described previously the forces of the chain 3 itself are those which stabilize the segments 21, 22, 23, 24, 25, 26 in a position of power transmission.

FIG. 14B shows the shift from the second configuration to the first configuration, starting from the situation shown in FIG. 14A. The shift starts moving all the actuators A21, A22, A23, A24, A25, A26 to its first configuration simultaneously, and thus the force Fe1, Fe2, Fe3, Fe4, Fe5, Fe6 applied by the elastic element E21, E22, E23, E24, E25, E26 changes its sense. This is the only force that receive the segments 23 and 24 so that they move in that direction until they meet a stop which exerts a reaction R3 'and R4' which stabilizes the segments 23, 24 due to the condition of light preload in which the elastic element E23, E24 remains. This stop is not a part of the constraint means 6, C21, C22, C23, C24, C25, C26 and has not the function of transmitting the force of the chain 3, but simply it has to hold the segments 21, 22, 23, 24, 25, 26 in their first configuration, function that can be performed for example the cover 8 of FIG. 17. However, the rest of the segments 21, 22, 25, 26 are in contact with the chain 3 such that they are subjected to other forces that determine their position. For example, the segment 22 is subjected to the maximum tension of the chain Fmax, corresponding to the force transmitted between the chain-ring and the rear sprocket engaged, having the same magnitude and direction.

This force of the chain Fmax is higher than the force of the elastic member Fe2, even when it is in its configuration of maximum preload, so that the segment 22 is maintained in the second configuration, although the actuator A22 is in the first configuration, resting on the stop means C22 which exerts a high reaction force R2 mainly due to the transmission of the force of the chain Fmax.

However, even when engaged with the chain 3, the transmission forces are not applied to the segment 21, and thus the displacement starts to the first configuration due to the elastic force Fe1, but after a small displacement. The chain 3 which is engaged in this segment 21 and also in the segment 22 that is fixed in the second configuration provides physical opposition to the displacement by creating the reaction force Fc12, which stabilizes the segment in this intermediate position. Similarly, the segments 26 and 25 are slightly displaced toward the first configuration until the chain 3 between segments acquires a tension which stabilizes the position of the segment. It is noteworthy that the segment 25 is also subjected to the force Fmin of the chain 3 corresponding to the tension of the tensor of the rear derailleur.

From the situations shown FIG. 14B to FIG. 14C ⅙ turn of the chain-rings 1, 2 elapses so that the chain 3 engages the first chain-ring 1, and the segment 25 is released from the chain 3 such that is moved to the first configuration thanks to the force Fe5 of the elastic element E25. The force transmission ceases to be applied on the segment 22 so that there is not sufficient forces to remain in the second configuration and shifts to the first one to the extent allowed by the chain 3, just as the chain 3 determines the positions of segments 21 and 26.

From FIG. 14C in ½ rotation, the segments 26, 21 and 22 are released from the chain 3 and thus the system acquires the first configuration as shown in FIG. 14D.

As shown, the direction of movement proposed by the present disclosure and its interaction with the forces of the chain 3 allow a control of the displacement of the segments 21, 22, 23, 24, 25, 26 in a novel manner with respect to the previous art.

For the shift between the first and second configuration to be done correctly a tension Fmax higher than Fmin is required. Considering that any forward rotation of the chain-rings it is also necessary that Fmax exceeds Fmin, the shifting process should be done correctly in any situation.

FIG. 15A represents the same situation in the first configuration as FIG. 14D. Driving all actuators A21, A22, A23, A24, A25, A26 to the second configuration the segments 21, 22, 23, 24, 25, 26 are moved to the position of FIG. 15B. The segments 21, 22 which are in the free chain zone ZLC have been moved to the second configuration by the force of the elastic elements E21, E22 due to the preload exerted by the actuators A21, A22, where they have been held back by the constraint means C21 and C22 where the reaction forces R1 and R2 appear. However, the other segments 23, 24, 25, 26 being displaced by the elastic elements E23, E24, E25, E26 from the first configuration encounter the chain 3 which limits the advance by exerting reaction forces Rc3, Rc4, Rc5, Rc6.

Figure 15C:
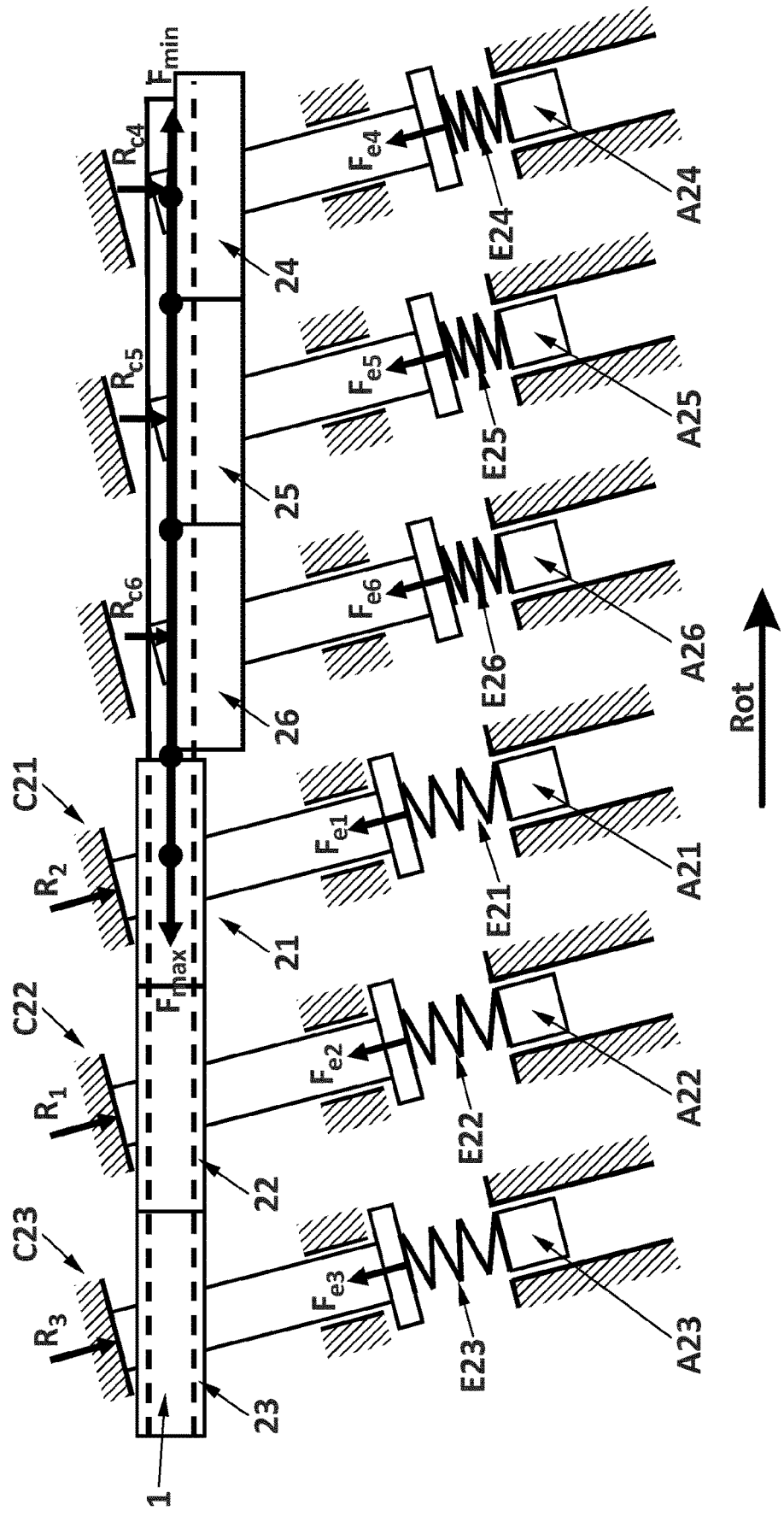
Figure 15D:
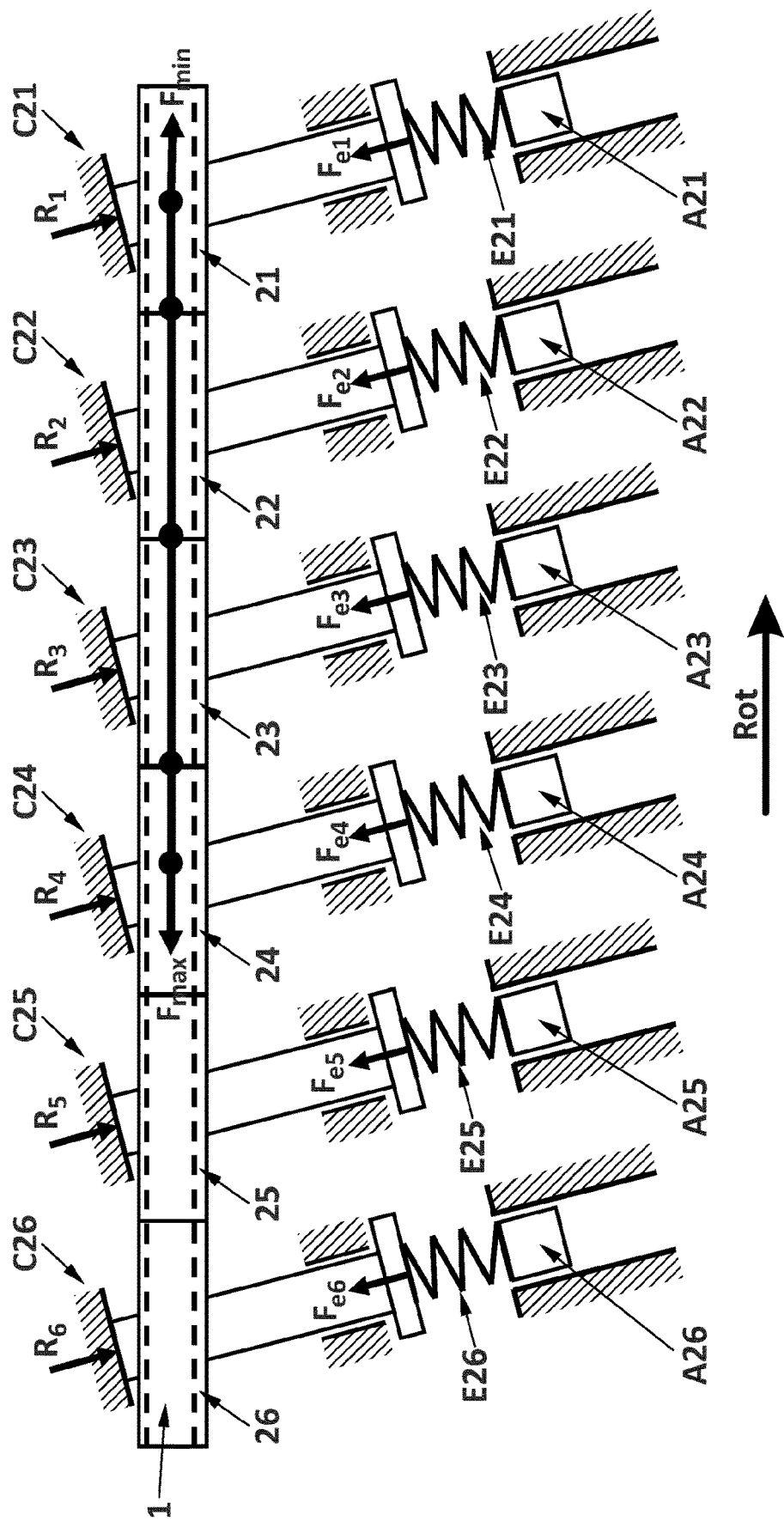

After ⅙ the chain-rings 1, 2 are in the situation of FIG. 15C in which the chain 3 has engaged with the segment 21 and the segment 23 ceases to contact the chain 3. Thus, the segment 23 is free to continue its movement due to preload Fe3 of the elastic member E23 until it abuts on the constraint means C23 in the position of the second configuration. FIG. 15D shows that, after another ½ turn, the chain 3 is engaging in the segments of the second chain-ring 2 while it releases the segments until then blocked so that they reach the configuration corresponding to the second position. It is a course of action similar to that known in the art.

With the incorporation of the elastic elements E21, E22, E23, E24, E25, E26, the segments 21, 22, 23, 24, 25, 26 are no longer controlled in in position, wherein the position of the actuator A21, A22, A23, A24, A25, A26 defined the position of the segment 21, 22, 23, 24, 25, 26, but are now controlled in force, i.e. that the force applied on the elastic element E21, E22, E23, E24, E25, E26 and the reactions of the surroundings of each segment define its position. Then for example all the actuators A21, A22, A23, A24, A25, A26 can be simultaneously activated and the system is self-managed through the forces of reaction for displacing appropriately the segments 21, 22, 23, 24, 25, 26 one by one.

In this new way of proceeding the condition to start activation is also different. With the direct action of the segments 21, 22, 23, 24, 25, 26, the condition for initiating the shift was that the first segment to move was the segment present in the free chain zone ZLC. However, in this new form of action based on forces the condition is that the first segment to move is in the free chain zone ZLC or in position close thereof in addition to the previous segment not being in the free chain zone, and therefore it cannot move when activating the actuators.

That the first segment to move is completely in the free chain zone ZLC does not matter. If it is not there, it will not move at all because of the retention by the chain 3, but then, as soon as it is released, it will move appropriately. This is a novelty with respect to the known prior art, where all known systems require segmented chain-rings to move the segment is the free chain zone to start their shift. According to the present disclosure, initiating displacement previously, to the extent allowed by tolerance with the chain 3, more time for activating is achieved, whereby the requirements on the actuators A21, A22, A23, A24, A25, A26 are reduced, which may be more compact, lighter and more efficient.

Even with the introduction of the elastic element E21, E22, E23, E24, E25, E26, it must be the guiding means 4 (which can be implemented in the actuator A21, A22, A23, A24, A25, A26 itself) which is in charge to guide the segments 21, 22, 23, 24, 25, 26 between configurations and provide stability and support in this interval. But stability in the final positions, in the first and second configurations, will come from the elastic element E21, E22, E23, E24, E25, E26 that will carry out a preload of the segment 21, 22, 23, 24, 25, 26 against the first chain-ring 1 in the second configuration, and of the segment 21, 22, 23, 24, 25, 26 against an auxiliary cover 8 attached to the first chain-ring 1 or to the fixed rotational part 1' in the first configuration.

With this approach, in a segmented chain-rings system wherein all the segments 21, 22, 23, 24, 25, 26 are equal or no matter which is moved first in the shift sequences, the actuator A21, A22, A23, A24, A25, A26 can act at any time and get a proper shift process. In this case, the angular position sensor would not be necessary and the control system would be very simple. However, in other segmented chain-rings systems the displacement sequence in the shift must have a certain order with specific up-shift segments 21, 24 and specific down-shift segments 22, 25, so a sensor of angular position to begin the process at the right time is still needed. At that time, all actuators A21, A22, A23, A24, A25, A26 will be activated simultaneously, the up-shift segment 21, 24 will be moved and then the rest will be sequentially moved according to the self-management ability of the system.

The segments 21, 22, 23, 24, 25, 26 comprise a stop 23a, 26a of a contiguous segment, such that a segment subsequent or previous cannot move from the first configuration to the second configuration or vice versa the segment provided with the stop 23a, 26a does not do it.

Figure 21:
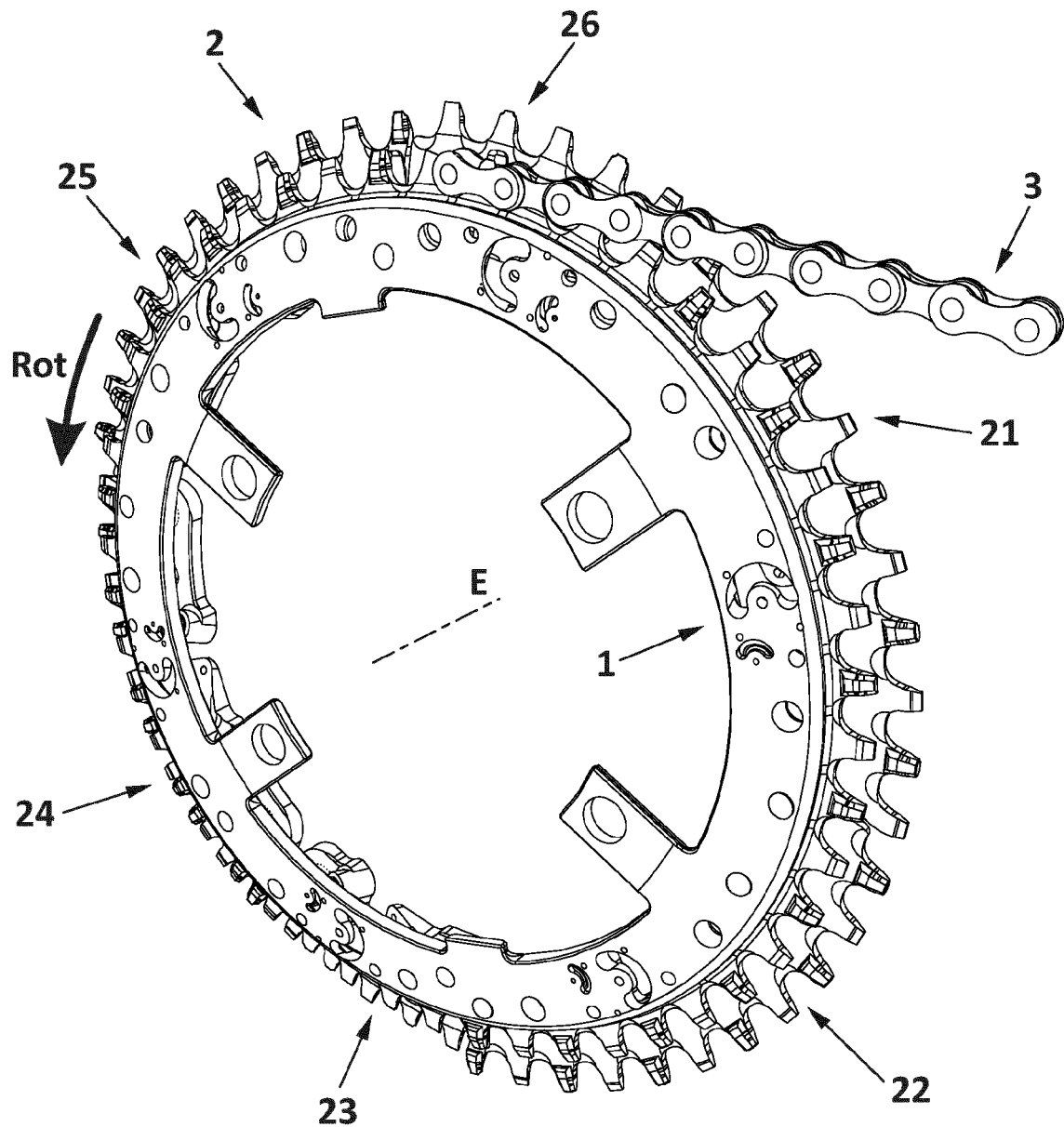
FIG. 21 shows the set composed of a small chain-ring, a big chain-ring and a chain in the configuration for shifting from the small chain-ring to the big chain-ring.
Figure 22:
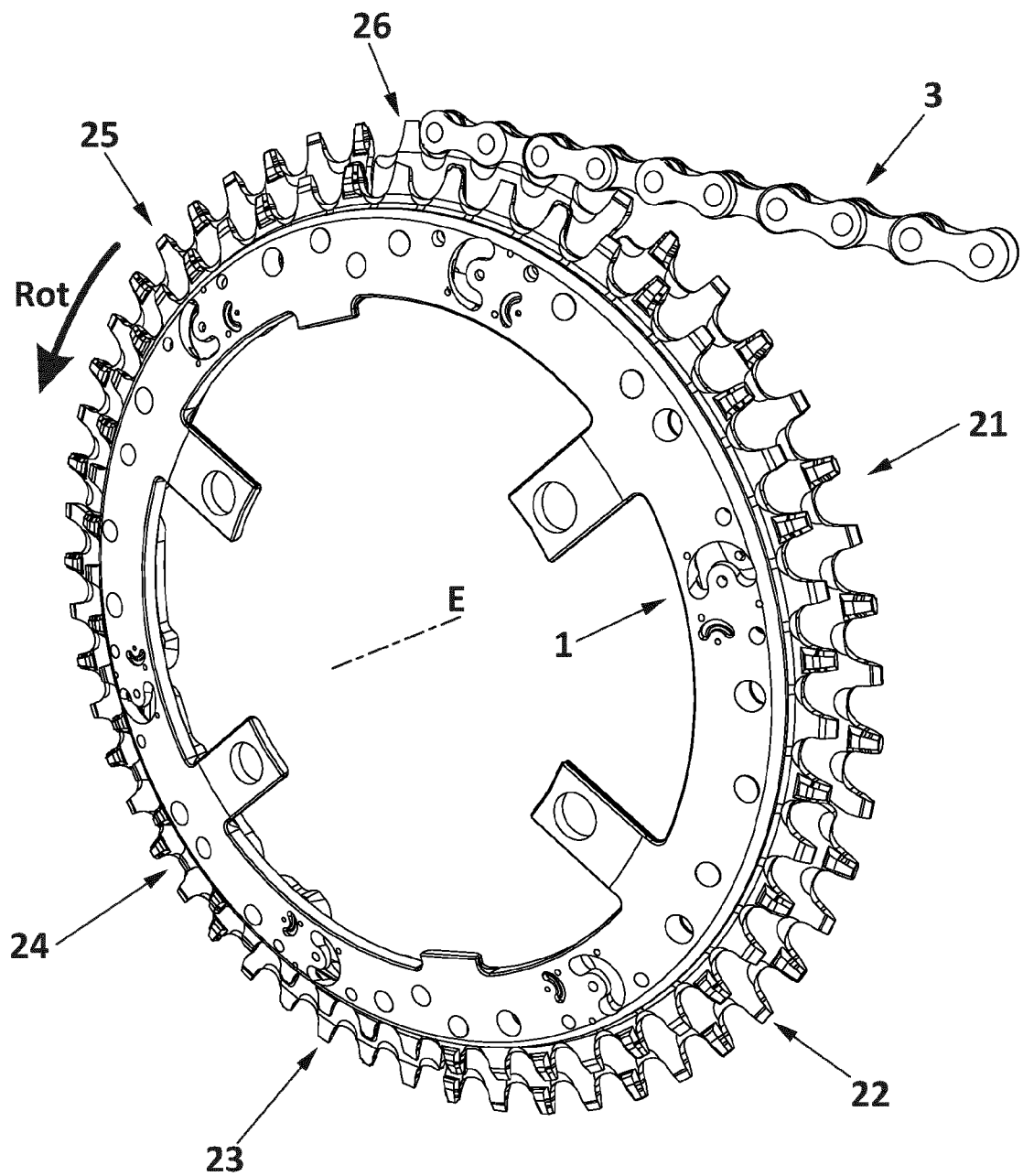
FIG. 22 shows the set composed of a small chain-ring, a big chain-ring and a chain in the configuration wherein the power is transmitted through the big chain-ring.
Figure 23:
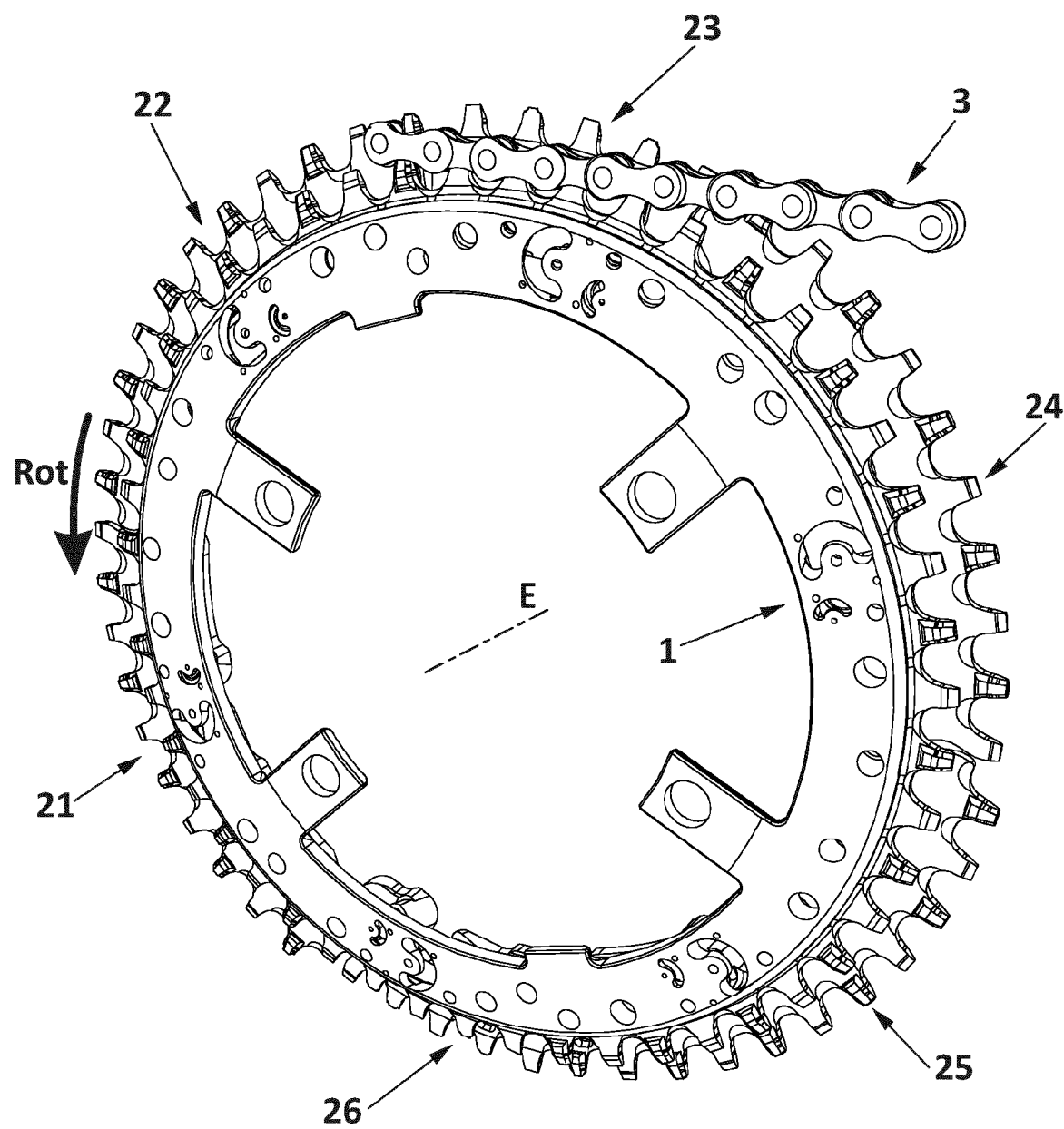
FIG. 23 shows the set composed of a small chain-ring, a big chain-ring and a chain in the configuration for shifting in the down-shift from the big chain-ring to a small chain-ring.

The use of stops 23a, 26a may be useful for example in segmented chain-rings systems, such as the system of FIG. 16, in which the first segment to move in a shift from the first configuration to the second configuration is an up-shift segment 21, 24 as illustrated in FIG. 21, and the first segment to move in a shift from the second configuration to the first configuration is a complementary segment 23, 26, the down-shift segment 25, 22, being the last to move, as illustrated in FIG. 23.

According to the new way of proceeding with control by forces, for a shift from the second configuration to the first configuration or down-shift from the second chain-ring 2 to the first chain-ring 1, the first segment to displace is the complementary segment 23, 26, so before initiating the shift it has to be ensured that the down-shift segment 22, 25 is held by the chain 3 and will not move when the drivers D21, D22, D23, D24, D25, D26 will act. As shown in FIG. 16, in some cases the down-shift segments 22 and 25 are large segments, so in a rotation Rot, the time elapsed from the engagement of the down-shift segment 22, 25 and the activation of the actuators A21, A22, A23, A24, A25, A26 can start, until the zone of the first chain-ring 1 corresponding to the complementary segment 23, 26 is engaged, since then the activation of the actuators A21, A22, A23, A24, A25 A26 has been executed, is high. That is, the available time for activation in down-shift for the actuators A21, A22, A23, A24, A25, A26 is high.

On the other hand, in the shifts from the first configuration to the second configuration, or up-shift from the first chain-ring 1 to the second chain-ring 2, the first segment to displace is the up-shift segment 21, 24, such that before initiating the shift it has to be ensured that the complementary segment 26, 23 is retained by the chain 3 and will not move when the actuators A21, A22, A23, A24, A25, A26 will act.

As shown in FIG. 16, in some cases the complementary segments 23 and 26 are small segments, such that in a rotation Rot, the time elapsed from the moment wherein the zone of the first chain-ring 1 corresponding to the complementary segment 23, 26 is engaged and the actuation of the actuator A21, A22, A23, A24, A25, A26 can be initiated, until the up-shift segment 21, 24 engages, such that in that moment the actuation of the actuators A21, A22, A23, A24, A25, A26 has been carried out, is reduced. That is, the available actuation time in up-shift for the actuators A21, A22, A23, A24, A25, A26 is reduced.

To increase the available actuation time in up-shift for the actuators A21, A22, A23, A24, A25, A26 it is possible to add a tab 23a, 26a (also called stop) to the complementary segments 23, 26 as depicted in FIG. 16. In this way, in the shift from the first configuration to the second one, even if the complementary segment 23, 26 are in the chain free zone ZLC when the actuators A21, A22, A23, A24, A25, A26 are activated, they will not move, since the down-shift segment 22, 25 being in the second configuration retains it thanks to the tab 23a, 26a.

Thus, the activation time is high, and includes the time interval elapsed from the time the zone of the first chain-ring 1 corresponding to the down-shift segment 25, 22 is engaged until the up-shift segment 21, 24 is engaged. After the displacement of the up-shift segment 21, 24 from the first configuration to the second one, it will be the down-shift segment 22, 25 which is moved from the first configuration to the second when it reaches the free chain zone ZLC, breaking the contact between this down-shift segment 22, 25 and the tab 23a, 26a of the complementary segment 23, 26, and then the complementary segment 23, 26 may be moved when it reaches the free chain zone ZLC.

This tab 23a, 26a also affects to the displacements for shifting from the second configuration to the first one, because the down-shift segment 22, 25 may not be moved before the complementary segment 23, 26. The shift will start when the down-shift segment 22, 25 is engaged with the chain 3, such that a complementary segment 23, 26 will be the first to move to the first configuration when in the free chain zone ZLC, then an up-shift segment 24, 21 will be moved when it reaches the free chain zone ZLC, but then it will be needed that both the next up-shift segment 25, 22 and the next supplementary segment 26, 23 are in the free chain zone ZLC to move simultaneously. Subsequently, it will be the up-shift segment 21, 24 which will move to reach the free chain zone ZLC and will end with the displacement of the down-shift segment 22, 25 that will be able to move from the second configuration to the first without problems due to the subsequent segment 23, 26 was already in the first configuration.

The space to move an up-shift segment 22, 25 together with a complementary segment 23, 26 in the chain free zone ZLC is small, but as the actuators A21, A22, A23, A24, A25, A26 have already been actuated, and the activation will start automatically after coming off the chain 3, it should generally be sufficient.

In general, it is preferable to accelerate the initial displacement of the up-shift segment 21 in an up-shift because it is the first segment to move and requires additional time margins due to the actuator speed and precision of the position sensor, even if it means hinder the displacement of the down-shift segments 22, 25 in a down-shift, which is a rapid shift that starts when is possible according to the preload of the elastic element E22, E25.

In the preferred solution, the drivers D21, D22, D23, D24, D25, D26 are bladders as illustrated in FIGS. 11, 16, 18 and 19. Bladder means are a closed shape with a cavity for the pressured air that changes its shape when the pressure therein increases, thus displacing one end which is attached to the segment 21, 22, 23, 24, 25, 26 in the direction of displacement M, as seen for example in FIG. 11, wherein the bladder or drive D22 is compressed by the absence of pressure, while the bladder or drive D23 is extended due to the pressurization of the air inside. This structure can be more compact than a pneumatic cylinder and also has less friction. In this case, the elasticity of the drivers D21, D22, D23, D24, D25, D26 depends on the compressibility of air and the elasticity of the bladder. The disadvantage with respect to the cylinder is that the movement guiding is not effective, so it is desirable to have guide means apart from the driver 4 as illustrated in FIGS. 16 and 18.

Figure 17:
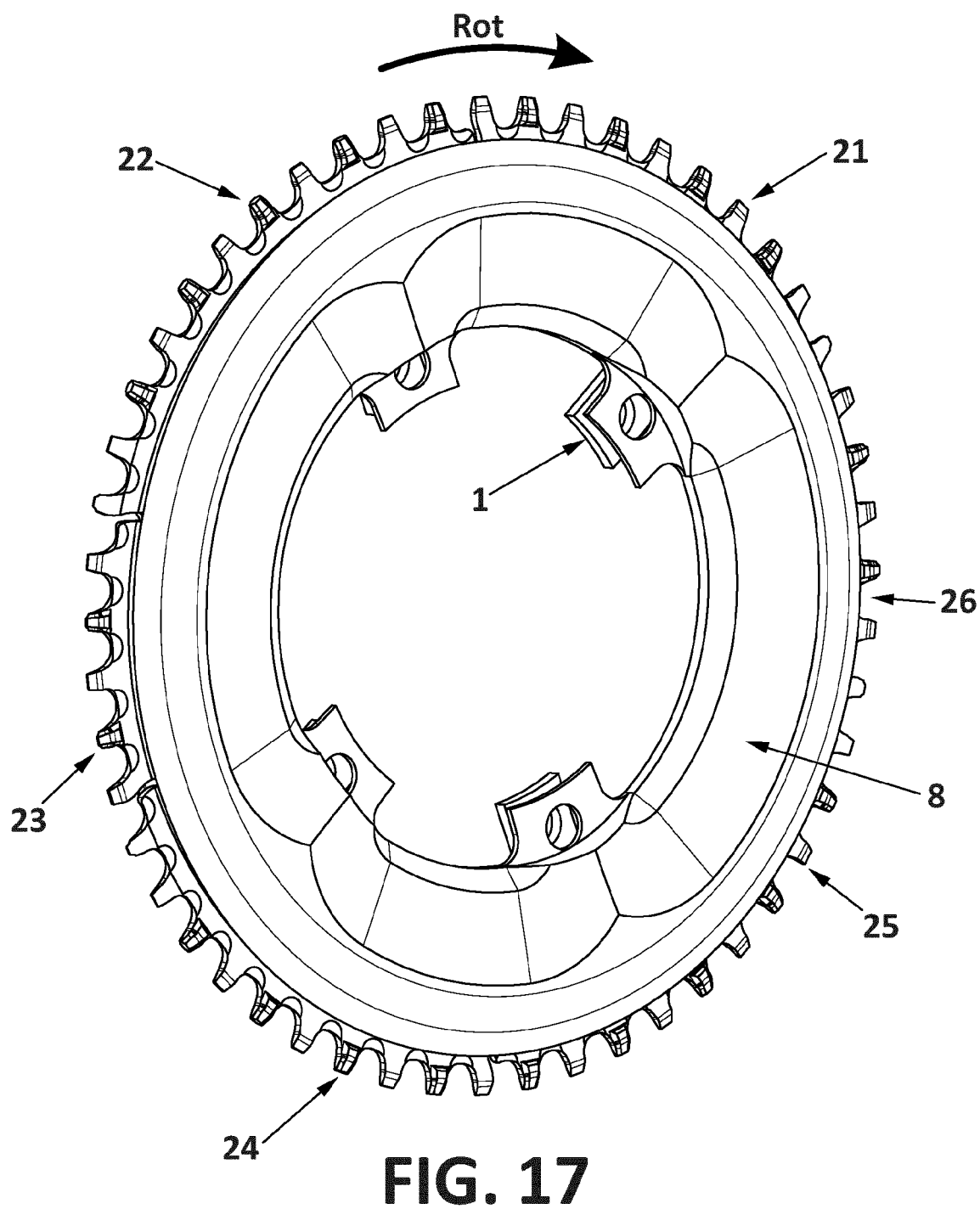
FIG. 17 shows a perspective view of a preferred embodiment of the set provided with a cover.

The pneumatic elements associated with the bladders, like the electrical elements (angle sensor, controls, . . . ) are all integrated in the rotational part, for example the cover 8 shown in FIGS. 17, 18 and 19, and there will be no need to add anything to the fixed part of the bicycle, so it is compatible with all bike frames available, and is also very easy to assemble. Nor is there any friction between the rotational and fixed part because there is no fixed part.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. Set for a power transmission system, the set comprising a first chain-ring, a second chain-ring having a common axis with the first chain-ring and provided with more teeth than the first chain-ring and a chain, wherein the second chain-ring is formed by segments, the set comprising displacement means with axial component of the segments with respect to the first chain-ring such that the segments can be sequentially moved in a chain free zone such that at least two configurations for each segment are defined:

a first configuration wherein the segments are in a first position away from the first chain-ring in a direction of the common axis and wherein the chain can engage with the first chain-ring without interference of the segments; and a second configuration wherein the segments are closer to the first chain-ring in the direction of the common axis than in the first configuration and wherein the chain can engage with the second chain-ring;

the displacement means being formed by guiding means and drivers, the guiding means being configured for guiding the segments such that the relative movement of each tooth of the segments with respect to the first chain-ring, in its displacement from the first configuration to the second configuration, has a tangential component having the sense of the chain traction.

2. Set according to claim 1, wherein each one of the segments and the first chain-ring, or a part solidary to the first chain-ring, comprise constraint means that in the second configuration integrally transmit the traction force of the chain to the first chain-ring or to the part solidary to the first chain-ring, while not exerting opposition forces to the drivers forces when the segments are stressed to bring them from the second configuration to the first configuration.

3. Set according to claim 2, wherein the constraint means comprise at least two frustoconical protuberances in each one of the segments or in the first chain-ring and at least two complementary openings in the first chain-ring or in each one of the segments respectively.

4. Set according to claim 1, wherein the first chain-ring is formed by a support part of the teeth and a teeth part, wherein the segments forming the second chain-ring are each formed by a support part of the teeth and a teeth part, and wherein the guiding means are configured to bring the support parts of the second chain-ring in contact with the support part of the first chain-ring, wherein the segments are circular crown sectors or oval crown sectors.

5. Set according to claim 1, wherein each segment has a driver.

6. Set according to claim 1, wherein the drivers comprise an actuator and an elastic element arranged in series.

7. Set according to claim 6, wherein all the drivers can be simultaneously actuated.

8. Set according to claim 6, wherein some of the segments comprise a stop of a contiguous segment, such that a segment subsequent or previous cannot move from the first configuration to the second configuration or viceversa if the segment provided with stop does not move.

9. Set according to claim 6, wherein the elastic elements are arranged for bringing the segments to the first configuration or the second configuration when no forces are exerted by the actuators.

10. Set according to claim 1, wherein the drivers are pneumatic.

11. Set according to claim 10, wherein the drivers are pneumatic cylinders, which also form the guiding means.

12. Set according to claim 11, further comprising pressurize fluid storage means to actuate the drivers.

13. Set according to claim 10, wherein the drivers are bladders.

14. Set according to claim 13, further comprising pressurize fluid storage means to actuate the drivers.

15. Set according to claim 10, further comprising pressurize fluid storage means to actuate the drivers.

16. Bicycle comprising a chain-rings set, the chain-rings set comprising a first chain-ring, a second chain-ring having a common axis with the first chain-ring and provided with more teeth than the first chain-ring and a chain, wherein the second chain-ring is formed by segments, the chain-rings set comprising displacement means with axial component of the segments with respect to the first chain-ring such that the segments can be sequentially moved in a chain free zone such that at least two configurations for each segment are defined:
- a first configuration wherein the segments are in a first position away from the first chain-ring in a direction of the common axis and wherein the chain can engage with the first chain-ring without interference of the segments; and
- a second configuration wherein the segments are closer to the first chain-ring in the direction of the common axis than in the first configuration and wherein the chain can engage with the second chain-ring;
- the displacement means being formed by guiding means and drivers, the guiding means being configured for guiding the segments such that the relative movement of each tooth of the segments with respect to the first chain-ring, in its displacement from the first configuration to the second configuration, has a tangential component having the sense of the chain traction.

17. Bicycle according to claim 16, wherein each one of the segments and the first chain-ring, or a part solidary to the first chain-ring, comprise constraint means that in the second configuration integrally transmit the traction force of the chain to the first chain-ring or to the part solidary to the first chain-ring, while not exerting opposition forces to the drivers forces when the segments are stressed to bring them from the second configuration to the first configuration.

18. Bicycle according to claim 16, wherein constraint means comprise at least two frustoconical protuberances in each one of the segments or in the first chain-ring and at least two complementary openings in the first chain-ring or in each one of the segments respectively.

19. Bicycle according to claim 16, wherein the first chain-ring is formed by a support part of the teeth and a teeth part, wherein the segments forming the second chain-ring are each formed by a support part of the teeth and a teeth part, and wherein the guiding means are configured to bring the support parts of the second chain-ring in contact with the support part of the first chain-ring, wherein the segments are circular crown sectors or oval crown sectors.

* * * * *